(12) United States Patent
Ikegami et al.

(10) Patent No.: US 6,854,000 B2
(45) Date of Patent: Feb. 8, 2005

(54) IMAGE FORMING APPARATUS AND CONTROL METHOD FOR THE SAME

(75) Inventors: Hideyuki Ikegami, Numazu (JP); Tokuharu Kaneko, Mishima (JP); Shokyo Koh, Mishima (JP); Tsuyoshi Muto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/215,194

(22) Filed: Dec. 18, 1998

(65) Prior Publication Data

US 2002/0085229 A1 Jul. 4, 2002

(30) Foreign Application Priority Data

Dec. 27, 1997 (JP) .............................................. 9-369226
Mar. 31, 1998 (JP) ........................................... 10-087134

(51) Int. Cl.⁷ .......................... G06F 11/00; G06F 12/00; G06F 15/177
(52) U.S. Cl. ....................... 707/203; 707/200; 707/202; 710/14; 710/18; 710/19; 710/59; 713/1; 713/2; 714/1; 714/2; 714/21; 714/36; 714/100
(58) Field of Search ............................... 713/1, 2, 100; 707/200, 203, 511, 202; 710/1, 5, 7, 14–16, 18–20, 36, 37, 62, 64, 72, 74, 102–104, 59; 714/1, 2, 21, 36, 100

(56) References Cited

U.S. PATENT DOCUMENTS

| | | | | |
|---|---|---|---|---|
| 4,724,462 A | * | 2/1988 | Yamasaki et al. .............. 399/81 |
| 5,075,875 A | * | 12/1991 | Love et al. .................. 395/117 |
| 5,136,713 A | * | 8/1992 | Bealkowski et al. ......... 395/700 |
| 5,377,321 A | | 12/1994 | Kaneko et al. .............. 395/163 |
| 5,402,528 A | * | 3/1995 | Christopher et al. ........ 395/109 |
| 5,432,927 A | * | 7/1995 | Grote et al. .................... 713/2 |
| 5,522,076 A | * | 5/1996 | Dewa et al. .................... 713/2 |
| 5,530,554 A | * | 6/1996 | Maehara ...................... 358/296 |
| 5,537,626 A | * | 7/1996 | Kraslavsky et al. ........... 710/8 |
| 5,590,303 A | * | 12/1996 | Shibata et al. .............. 711/100 |
| 5,590,373 A | * | 12/1996 | Whitley et al. ............. 395/828 |
| 5,596,738 A | * | 1/1997 | Pope .......................... 711/103 |
| 5,603,056 A | * | 2/1997 | Totani ............................ 710/8 |
| 5,604,880 A | * | 2/1997 | Dipert ........................ 711/103 |
| 5,608,910 A | * | 3/1997 | Shimakura ................... 709/100 |
| 5,678,135 A | * | 10/1997 | Fukui et al. ................... 399/77 |
| 5,742,742 A | * | 4/1998 | Ueda ........................... 395/109 |
| 5,787,288 A | * | 7/1998 | Nagata et al. ............... 395/712 |
| 5,805,882 A | * | 9/1998 | Cooper et al. .................. 713/2 |
| 5,835,761 A | * | 11/1998 | Ishii et al. ................... 395/653 |
| 5,870,520 A | * | 2/1999 | Lee et al. ....................... 714/6 |
| 5,933,595 A | * | 8/1999 | Iizuka et al. ................ 711/164 |
| 5,940,074 A | * | 8/1999 | Britt et al. ................... 345/749 |
| 5,968,140 A | * | 10/1999 | Hall ............................. 710/14 |
| 5,968,141 A | * | 10/1999 | Tsai ............................. 710/14 |

(List continued on next page.)

FOREIGN PATENT DOCUMENTS

JP          08212079 A  *  8/1996  ........... G06F/9/445

OTHER PUBLICATIONS

Senma, Image Forming Device—Translation of JP 08212079 A—Aug. 1996.*

*Primary Examiner*—Jeffrey Gaffin
*Assistant Examiner*—Tanh Nguyen
(74) *Attorney, Agent, or Firm*—Fitzpatrick, Cella, Harper & Scinto

(57) ABSTRACT

In an image forming apparatus for forming an image in accordance with control codes stored in a plurality of memory media, when the control codes stored in the plurality of memory media to control the image forming apparatus is rewritten, rewrite execution codes adapted to execute rewrite of the control codes are transferred to predetermined one of the plurality of memory media from an external apparatus, and rewrite of the control codes is performed in accordance with the transferred rewrite execution codes.

14 Claims, 20 Drawing Sheets

U.S. PATENT DOCUMENTS

| | | | |
|---|---|---|---|
| 5,987,535 A | * 11/1999 | Knodt et al. | 710/15 |
| 6,035,346 A | * 3/2000 | Chieng et al. | 710/10 |
| 6,085,268 A | * 7/2000 | Lee et al. | 710/72 |
| 6,122,733 A | * 9/2000 | Christeson et al. | 713/2 |
| 6,134,021 A | * 10/2000 | Silverbrook | 358/1.18 |
| 6,134,711 A | * 10/2000 | Nakamura et al. | 717/169 |
| 6,170,043 B1 | * 1/2001 | Hu | 711/158 |
| 6,182,170 B1 | * 1/2001 | Lee et al. | 710/65 |
| 6,341,373 B1 | * 1/2002 | Shaw | 717/11 |

\* cited by examiner

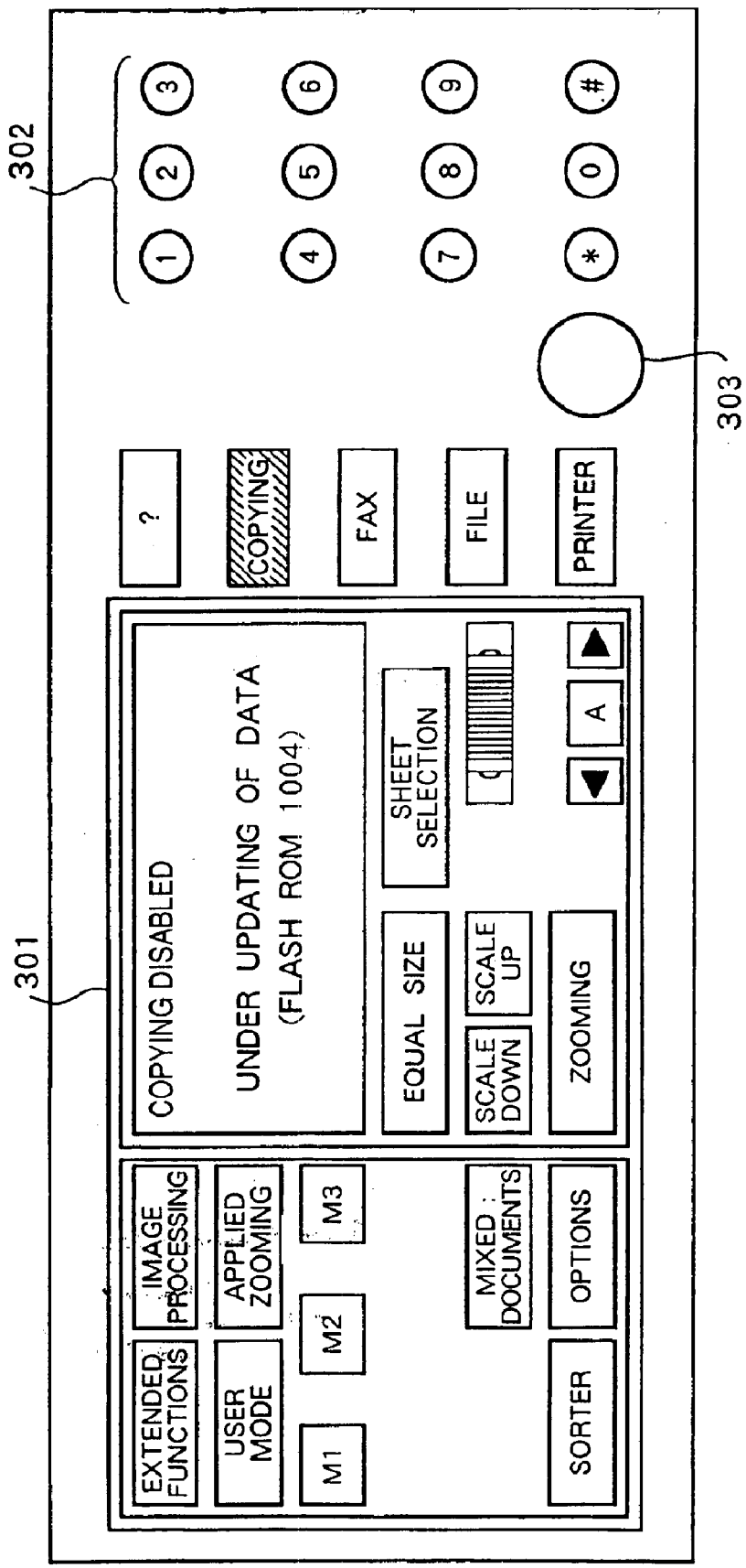

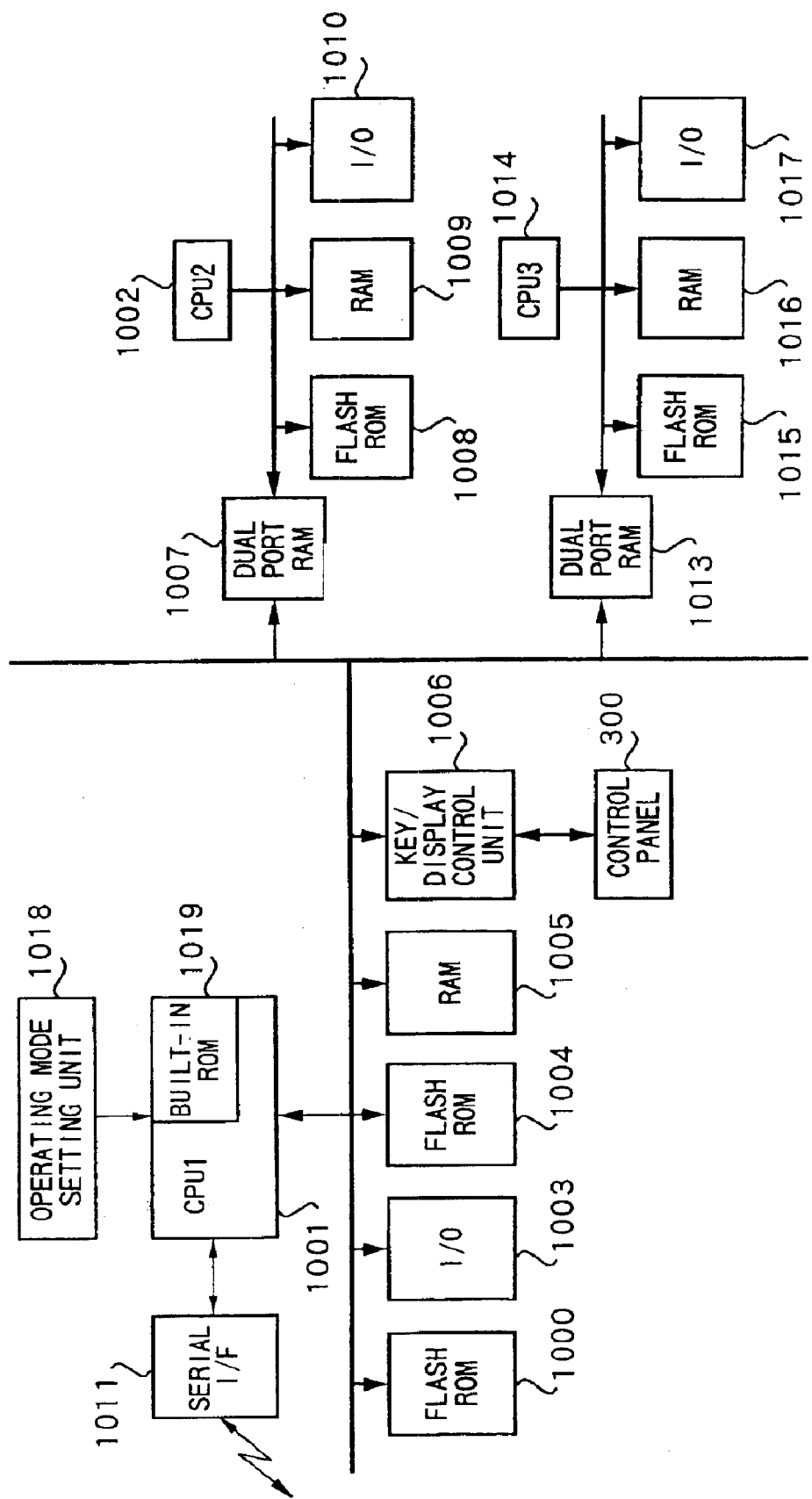

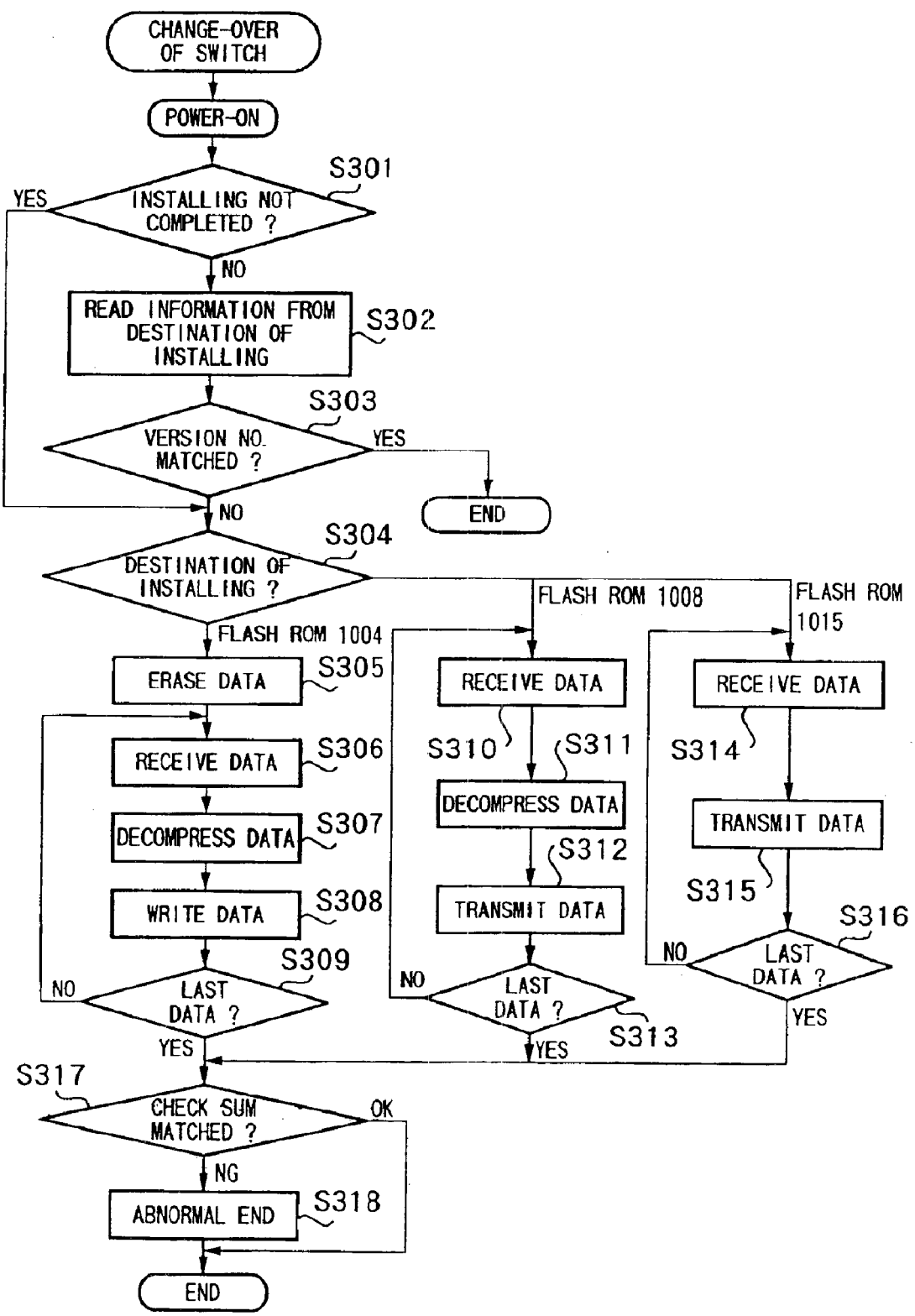

IMAGE FORMING APPARATUS AND CONTROL METHOD FOR THE SAME

BACKGROUND OF THE INVENTION

1. Field of the Invention

The present invention relates to an image forming apparatus forming an image in accordance with control codes stored in a memory medium, and a rewrite control method for the image forming apparatus.

2. Description of the Related Art

Hitherto, memory media such as ROMs (Read Only Memories) have been employed as memory means for storing control codes used for control of image forming apparatus. Rewritable memory media such as flash ROMs have also been employed in recent years. Control codes are rewritable by transferring data to such a rewritable memory medium from an external apparatus, e.g., a host computer.

In the conventional techniques, however, a rewrite process must have been carried out for a plurality of flash ROMs for completing rewrite, and a large amount of download programs have been required to be written in the ROMs or the like. Therefore, programs are more likely to contain bugs, and if bugs are found in ROMs or the like, those ROMs must be replaced. This has accompanied the problem of imposing a large load on rewrite work.

Also, the conventional techniques have had another problem in the rewrite process. Because of an interrupt area being used in common to image forming control, an interrupt area dedicated for the rewrite process cannot be secured. Accordingly, it is indispensable to monitor at all times whether data is transmitted from an external apparatus, meaning that the rewrite process takes a longer period of time.

Meanwhile, it is also known to store a rewrite program, which is necessary for carrying out rewrite of control programs transmitted from an external apparatus, not in a flash ROM where information slightly tends to be unstable, but in a ROM.

In such a case, a CPU (Central Processing Unit) executes various processes while controlling respective components in accordance with the rewrite program preset in a ROM.

Control programs are stored in a nonvolatile readable/writable ROM, allowing new control programs to be written in that ROM. On the other hand, a rewrite program used for down-loading the control programs is fixedly held in a memory medium which is not updated. In other words, changes of the rewrite program have not been taken into consideration.

As an example of the situation described above, in copying machines, printers and so on, control programs have been stored in a nonvolatile EPROM (Erasable Programmable ROM) or a mask ROM, but it has become common that a flash ROM, an EEPROM (Electrically Erasable Programmable ROM), etc., which are nonvolatile memories being readable and writable on-board, are employed so that the rewrite program can be updated without replacing the ROM by a new one when addition of functions or version-up of an application program will be necessary in future.

More specifically, when the rewrite program in a flash ROM is updated, a new rewrite program is downloaded into the flash ROM from a host computer, a CD-ROM drive, a floppy drive or the like which is connected to an image forming apparatus.

To this end, communication means is provided in the image forming apparatus, and a rewrite download program adapted for the image forming apparatus is held in a memory medium which is disposed in the apparatus and not updated.

In the conventional image forming apparatus, however, because the rewrite download program is fixedly held, control programs to be down-loaded have been restricted by the rewrite download program.

Further, because a manner of down-loading control programs is also determined by the rewrite download program, flexibility in a manner of download is small; hence it has been difficult to perform efficient download.

In the above method, for example, changing addresses of a ROM, into which control programs are to be down-loaded, has not been taken into consideration, and new control programs are down-loaded within the range of an address area originally assigned for the control programs in advance. Accordingly, if new control programs which are different in, e.g., assignment address area from the original control programs are down-loaded, the rewrite download program built in the image forming apparatus and the download application operating on the host computer cannot be utilized due to a difference in address configuration. In such a case, the ROM storing the rewrite download program must be replaced and hence the efficiency of rewrite work is lowered.

Additionally, where the rewrite download program is stored in a memory medium (e.g., a mask ROM) which is disposed in the image forming apparatus and not updated, that ROM must be replaced if there occurs any failure in the rewrite download program.

SUMMARY OF THE INVENTION

With the view of solving the problems set forth above, an object of the present invention is to provide an image forming apparatus and a rewrite control method for the image forming apparatus, with which rewrite is performed with a minimum amount of program data to be stored in a ROM or the like and improved reliability by storing, in a ROM or the like, a control program just required for transferring a download program to a RAM or the like, and then executing the transferred download program.

Another object of the present invention is to achieve high-speed rewrite by allowing an interrupt in not only an image forming process, but also a rewrite process.

Still another object of the present invention is to efficiently down-load control programs.

Other objects of the present invention will become apparent from the accompanying drawings and the following detailed description.

BRIEF DESCRIPTION OF THE DRAWINGS

FIG. 6 is a representation showing an example of display indicated when a flash ROM (1004) is rewritten;

FIG. 8 is a block diagram showing a construction of a control system for an image forming apparatus according to a second embodiment;

FIG. 13 is a flowchart showing a data rewrite process in a flash ROM according to the third embodiment;

DETAILED DESCRIPTION OF THE PREFERRED EMBODIMENTS

Preferred embodiments of the present invention will be described below with reference to the drawings.

[First Embodiment]

Figure 1:
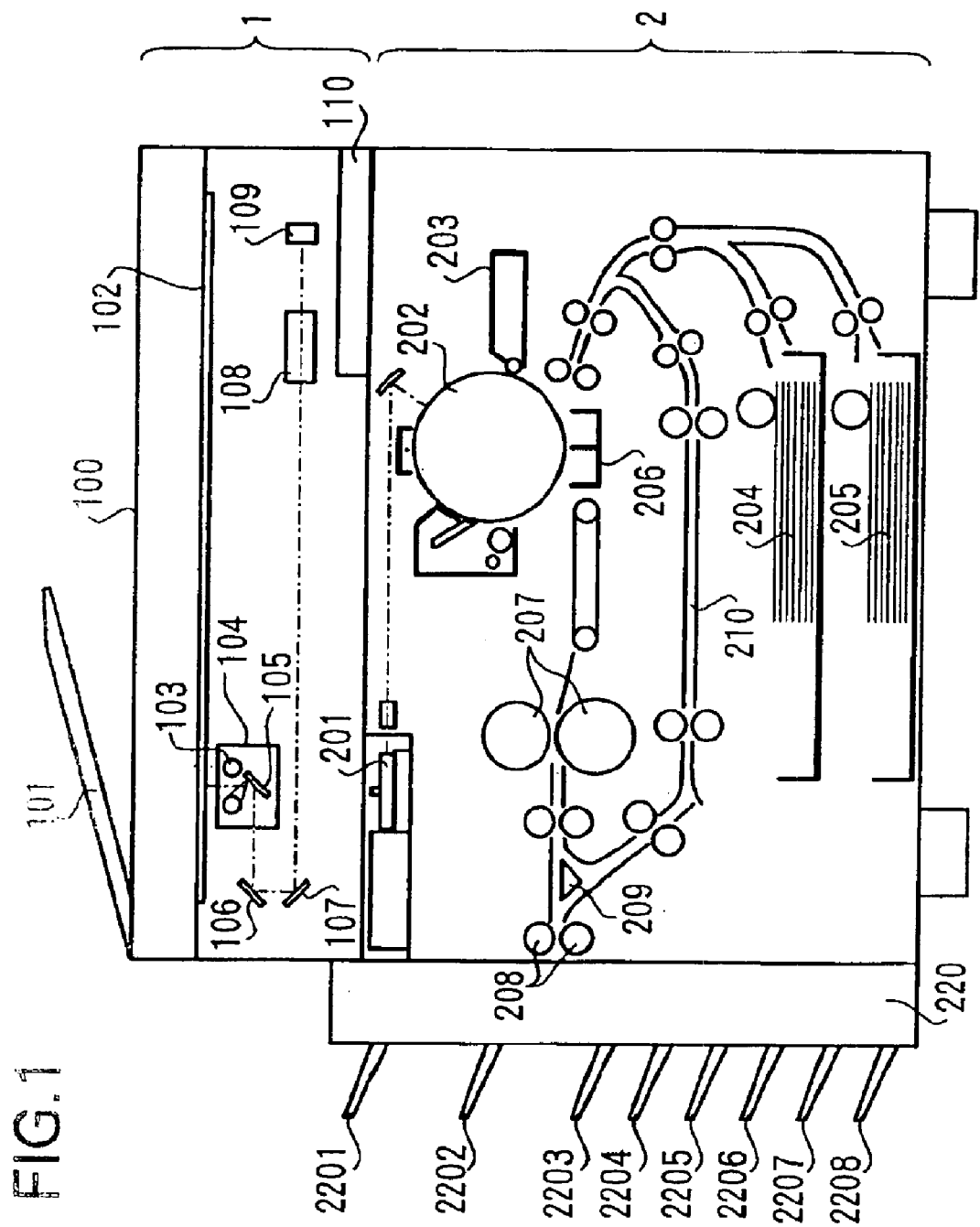
FIG. 1 is a sectional view showing a structure of an image forming apparatus according to a first embodiment.

FIG. 1 is a sectional view showing a structure of an image forming apparatus 100 according to this first embodiment. In FIG. 1, reference numeral 1 denotes a reader section and 2 denotes a printer section. Constructions of the reader section 1 and the printer section 2 will be described below separately.

In the reader section 1, document sheets placed on a document feeder 101 are successively carried one by one onto a document glass plate surface 102. When the document sheet reaches a predetermined position on the document glass plate surface 102, a lamp 103 in a scanner unit 104 is lit up and the scanner unit 104 is moved to illuminate the document sheet.

Light having reelected from the document sheet is introduced to a CCD image sensor unit (hereinafter referred to as a "CCD") 109 through mirrors 105, 106, 107 and a lens 108. The light having reflected from the document sheet and entered the CCD 109 is subjected to photoelectric conversion in the CCD 109 for conversion into an electric signal which is then sent to an image processing unit 110.

The electric signal, which is connected to the printer section 2 through an external switching circuit (not shown) in the image processing unit 110, is converted into a modulated optical signal by an exposure control unit 201, the modulated optical signal being irradiated to a photosensitive member 202. A latent image is formed on the photosensitive member 202 by the irradiated light and then developed by a developing unit 203. At the timing matched with the leading end of a developed image, a sheet of transfer paper is fed from a transfer paper stack cassette 204 or 205 so that the developed image is transferred onto the sheet of transfer paper in a transfer station 206. The transferred image is fixed to the sheet of transfer paper by a fixing unit 207, and thereafter the sheet of transfer paper is carried out to the exterior of the apparatus through a paper ejecting portion 208. The sheet of transfer paper having exited from the paper ejecting portion 208 is introduced to a sorter 220. The sorter 220 operates so as to eject sheets of transfer paper into trays 2202–2208 when a sorting function is effected, and to eject sheets of transfer paper into the uppermost tray 2202 as default setting when the sorting function is not effected.

A manner of forming images, which are successively read, on both surfaces of one sheet of output paper will be next described. Before reaching the paper ejecting portion 208, the sheet of transfer paper having an image fixed on its one surface by the fixing unit 207 in accordance with the above-mentioned process is reversed in travel direction thereof through a travel direction switching member 209 and then carried to a resupplied transfer paper stack portion 210. When a next document sheet is prepared, a document image is read in a similar manner to the above-mentioned process. As for a sheet of transfer paper, however, the sheet of transfer paper having the image already fixed on its one surface is fed to the transfer station 206 from then resupplied transfer paper stack portion 210 in a reversed state. Thus, two successive document images can be formed respectively on front and rear surfaces of the same sheet of transfer paper.

Figure 2:
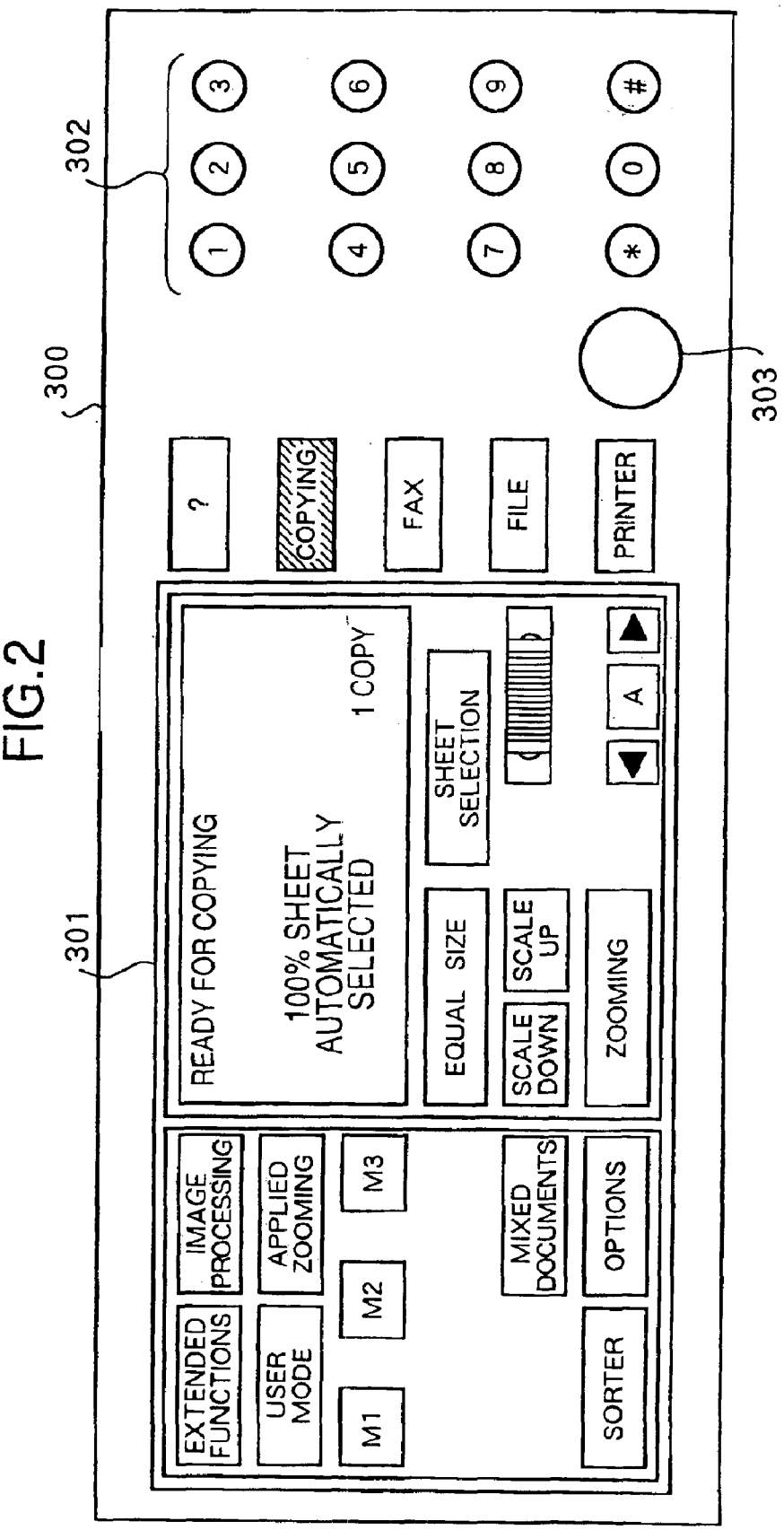
FIG. 2 is a representation showing a construction of a control panel according to the first embodiment.

FIG. 2 shows a construction of a control panel 300 according to the first embodiment. In FIG. 2, reference numeral 301 denotes a display section in which operating states of the apparatus, various messages and so on are displayed. The surface of the display section 301 is constructed of a touch panel so that the display section 301 can also serve as selection keys upon the surface thereof being touched. Reference numeral 302 denotes a ten-key portion comprising keys used to input numerals. Reference numeral 303 denotes a start key. Upon the start key 303 being depressed, the apparatus start the copying operation.

Figure 3:
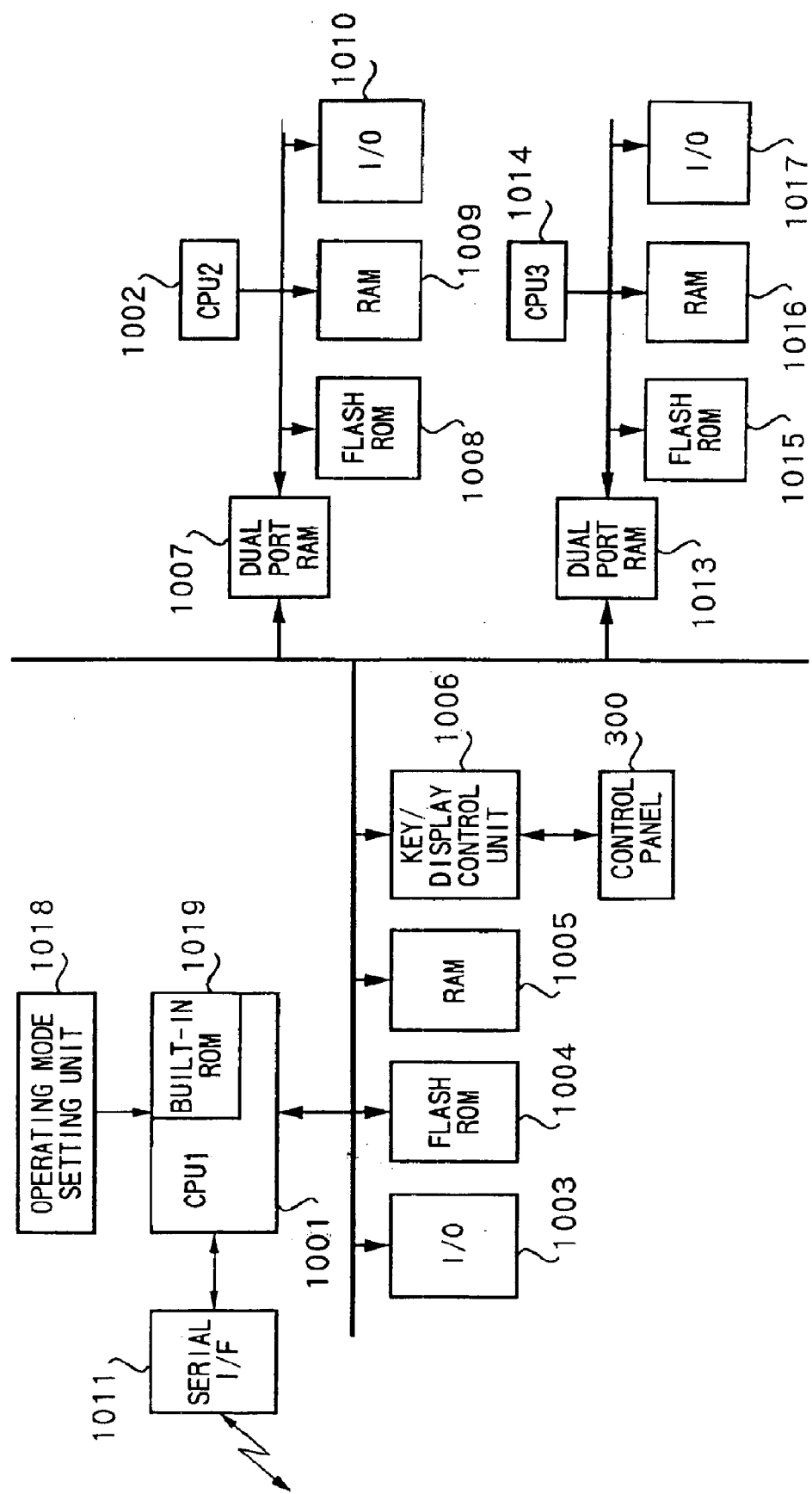
FIG. 3 is a block diagram showing a construction of a control system for the image forming apparatus according to the first embodiment.

FIG. 3 is a block diagram showing a construction of a control system for the image forming apparatus 100. In FIG. 3, reference numeral 1001 denotes a CPU for carrying out basic control of the entire apparatus. The CPU 1001 is connected, via an address bus and a data bus, to an input/output (I/O) port 1003, a flash ROM 1004 in which image forming control programs are written, a work RAM 1005 for use in execution of processing, and a key/display control unit 1006 for controlling display on and key inputs from the control panel 300.

In addition, the CPU 1001 includes a built-in ROM 1019 in which a program for transferring a control program adapted to rewrite the flash ROM 1004, etc. based on data transmitted from an external apparatus, such as a host computer (personal computer), to the RAM 1005 is written. Also, the CPU 1001 has a plurality of operating modes which can be selectively set by an operating mode setting unit 1018. During the normal image forming operation, the CPU 1001 is set to the mode in which the built-in ROM 1019 is not effective.

In such a control system, the CPU 1001 executes input/output control successively in accordance with the contents of the flash ROM 1004 for carrying out the image forming operation, and also receives key-input information from the control panel 300 through the key/display control unit 1006. Further, the CPU 1001 instructs the key/-display control unit 1006 to indicate the operating states of the apparatus 100, the operating mode set in response to the key input, etc., thereby controlling display on the control panel 300.

The image forming apparatus 100 also includes another CPU 1002 for executing control of operations of various motors, heaters and so on. The operation control of the various motors, etc. is performed in accordance with instructions from the CPU 1002. The CPU 1002 is connected, via an address bus and a data bus, to a flash ROM 1008 in which control programs are written, a work RAM 1009 for use in execution of processing, and an input/-output (I/O) port 1010. Various control motors, etc. are connected to the input/output (I/O) port 1010 as needed. Additionally, the CPU 1002 executes data communication with the CPU 1001 through a dual port RAM 1007 serving as interface means.

Further, the CPU 1001 executes data communication with a CPU 1014 for converting data, such as PDL codes, which is transmitted from the external apparatus, into an image signal through a dual port RAM 1013 serving as interface means. Upon receiving the PDL codes from the external apparatus, the CPU 1014 converts the received PDL codes into image data, requests image forming processing to the CPU 1001, which is control means for an image forming section, through the dual port RAM 1013, and then outputs the image data to the printer section 2 in synch with control of the CPU 1001. The CPU 1014 is connected, via an address bus and a data bus, to a flash ROM 1015 in which control programs are written, a work RAM 1016 for use in execution of processing and for developing the PDL codes into the image data, and an input/output (I/O) port 1017. Note that the input/output port 1017 is connected to a control port through which data, such as PDL codes, is received from the external apparatus.

In addition, the CPU 1001 executes data communication with a not-shown external apparatus, such as a personal computer, through a serial interface (I/F) 1011. The CPU 1001 also analyzes data received from the external apparatus through the serial interface 1011, and transmits data in the apparatus 100 to the external apparatus in accordance with an analyzed result. Further, the CPU 1001 performs rewrite of data in the flash ROMs 1004, 1008, 1015 based on data received from the external apparatus.

Figure 4:
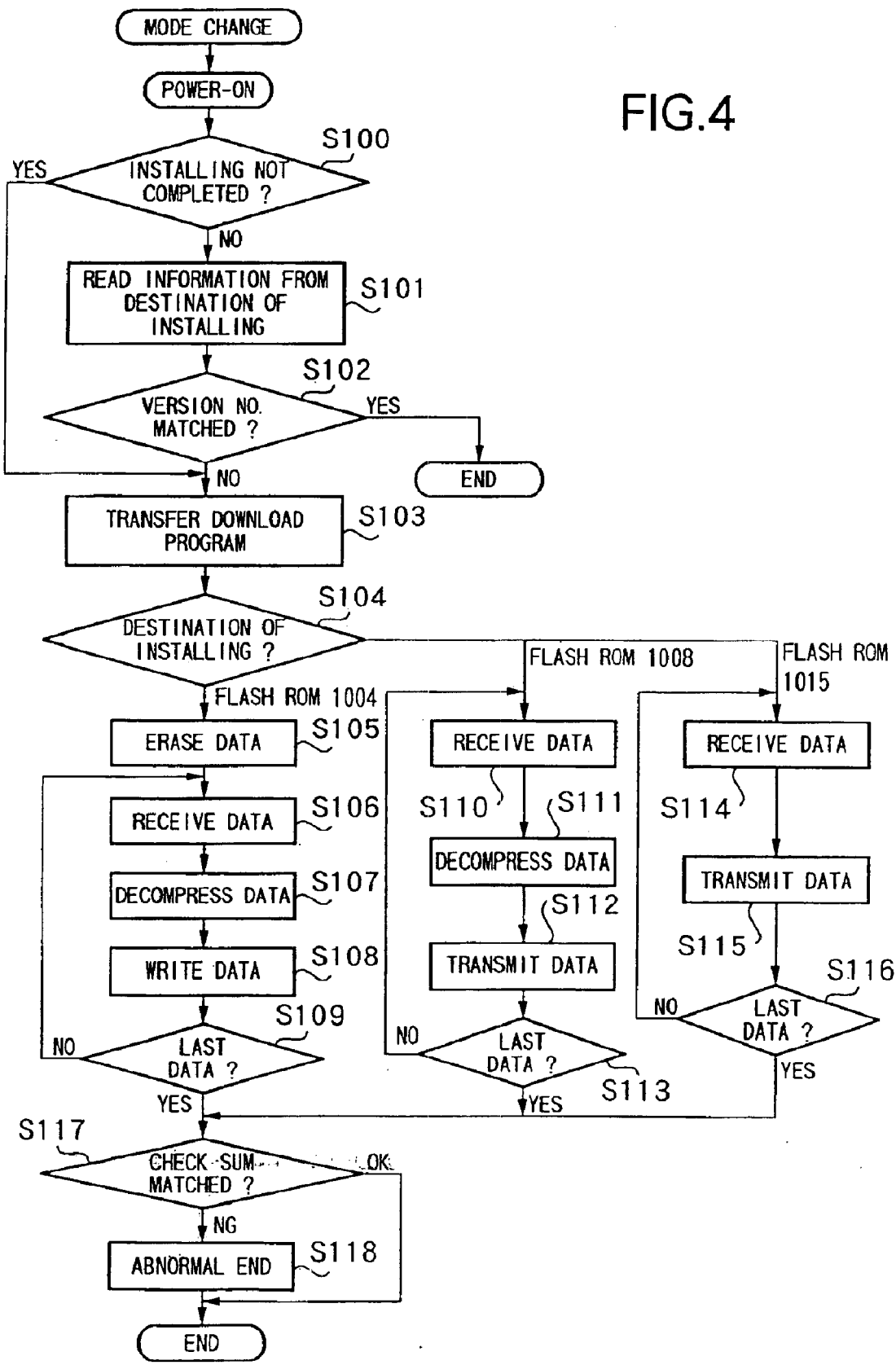
FIG. 4 is a flowchart showing a data rewrite process in a flash ROM according to the first embodiment.
Figure 7A:
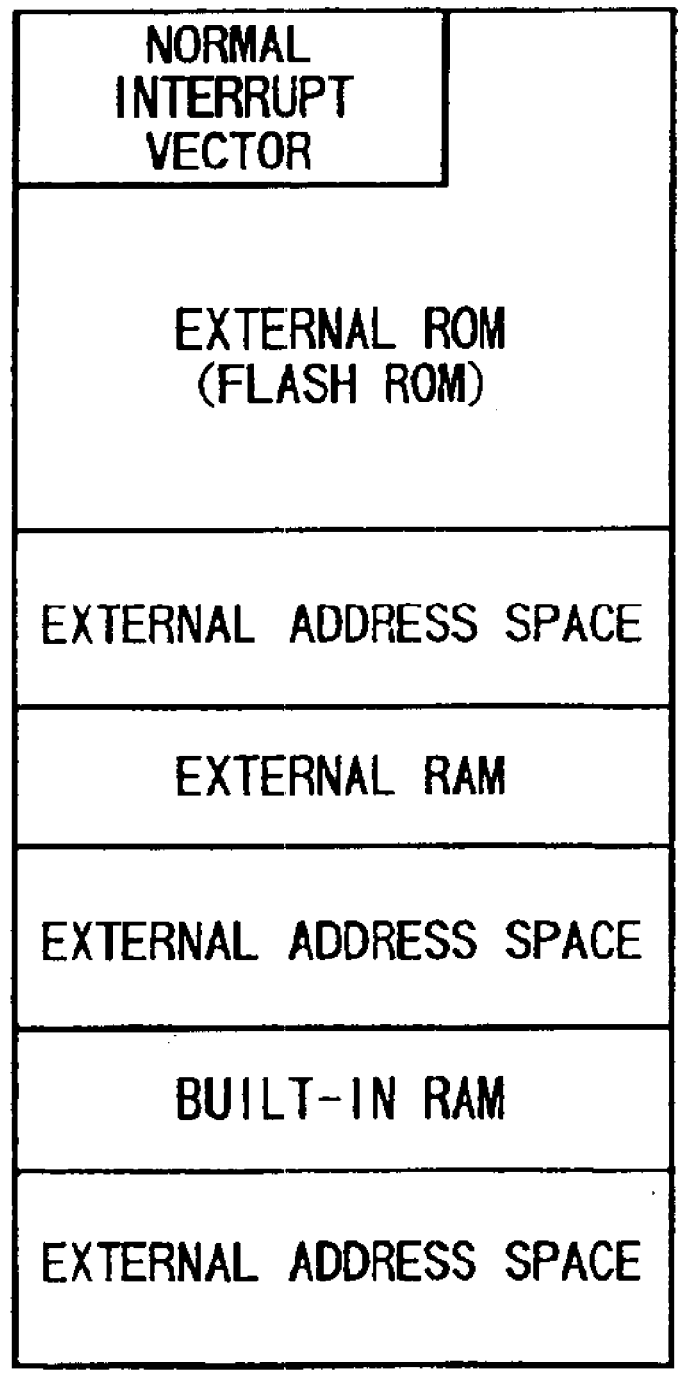
FIGS. 7A and 7B are each a representation showing a memory map according to the first embodiment.
Figure 7B:
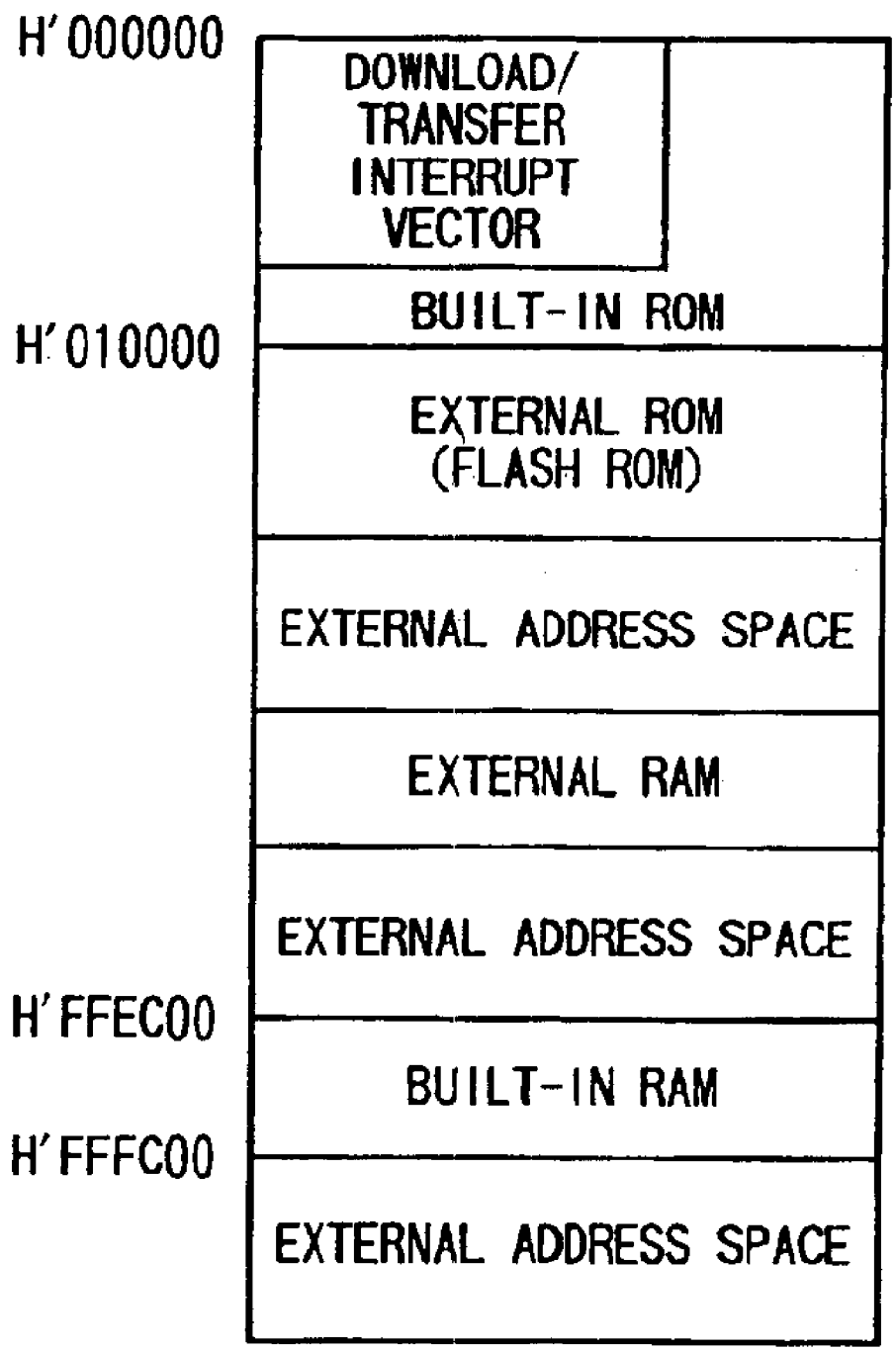

A process for rewriting data in the flash ROMs 1004, 1008, 1015 will be described below. FIG. 4 is a flowchart showing the data rewrite process in each flash ROM according to this first embodiment. This process is performed by the CPU 1001 when a power supply is turned on in a state where the built-in ROM 1019 is made effective. More specifically, when the data rewrite process is desired, this process is started and executed as described below by operating a dip switch or the like in a state where the power supply is not turned on, thereby establishing a mode in which the built-in ROM 1019 is effective, and thereafter turning on the power supply. In this connection, FIG. 7A shows a memory map used in the normal image forming operation, i.e., a memory map used for the execution of processing in the mode in which the built-in ROM 1019 is made not effective, and FIG. 7B shows a memory map used in the rewrite control operation, i.e., a memory map used for the execution of processing in the mode in which the built-in ROM 1019 is made effective. In other words, FIG. 7A shows a memory map used in a normal process to carry out the operation of a copying machine or a printer, and FIG. 7B shows a memory map used in a download process.

As will be seen from FIGS. 7A and 7B, part of the memory area assigned to the flash ROM in the mode in which the built-in ROM 1019 is not effective, is assigned to the built-in ROM 1019 in the mode in which the built-in ROM 1019 is effective. In the illustrated example, addresses from 000000h to 010000h represent an area shared by both the modes. Further, the shared area includes in its part a normal interrupt vector area in the mode in which the built-in ROM 1019 is not effective, and a transfer/-download vector area in the mode in which the built-in ROM 1019 is effective. Stated otherwise, the same memory space is occupied by the flash ROM during the image forming operation and by the built-in ROM during the rewrite control operation, thus enabling a vector area dedicated for the rewrite control to be ensured.

The reason why part of the shared memory area is provided as the transfer/download vector area in the illustrated example is that the memory is used upon an interrupt substantially in the same range for transfer to the RAM 1005 and download to the flash ROM, and therefore a common vector area can be used in both transfer and download.

Returning to FIG. 4, when execution of the rewrite control program is started, i.e., when in this embodiment the power supply is turned on in the mode in which the built-in ROM is effective, the operator is informed of the fact that the apparatus is under the rewrite process and the image forming operation cannot be effected.

First, in step S100, it is determined in accordance with information described below whether the rewrite or rewrite process of each of the flash ROMs 1004, 1008, 1015 has suspended or failed. If the rewrite of the flash ROMs 1008, 1015 has suspended, information indicating the suspension is noticed from the CPUs 1002, 1014 to the CPU 1001 through the dual port RAMs 1007, 1013. When the rewrite is determined as having suspended in response to the above notice, this means that the control data in each flash ROM is in a state not ensured. Therefore, the control flow proceeds to step S103 described later for executing a rewrite program transfer mode. Incidentally, how to determine whether the rewrite of the flash ROM 1004 has suspended will be described later.

On the other hand, if it is determined in step S100 that the rewrite has not suspended, the control flow proceeds to step S101 to read information in the flash ROM which is a destination of installing in an install mode. In subsequent step S102, the read version is compared with the version to be newly installed. If both the versions are in match with each other, there is no need of installing data. Therefore, the CPU indicates the end of the install mode to the operator, and also prompts the operator to turn off the power supply and to set the mode back to the mode in which the built-in ROM is not effective. However, if both the versions are not in match with each other in step S102, the control flow proceeds to step S103 to execute the rewrite program transfer mode.

In step S103, in accordance with the contents of the built-in ROM 1019, a rewrite program is transferred to the RAM 1005 based on data transmitted from the external apparatus. After that, the control flow proceeds to step S104 to execute a flash ROM rewrite mode.

Figure 5:
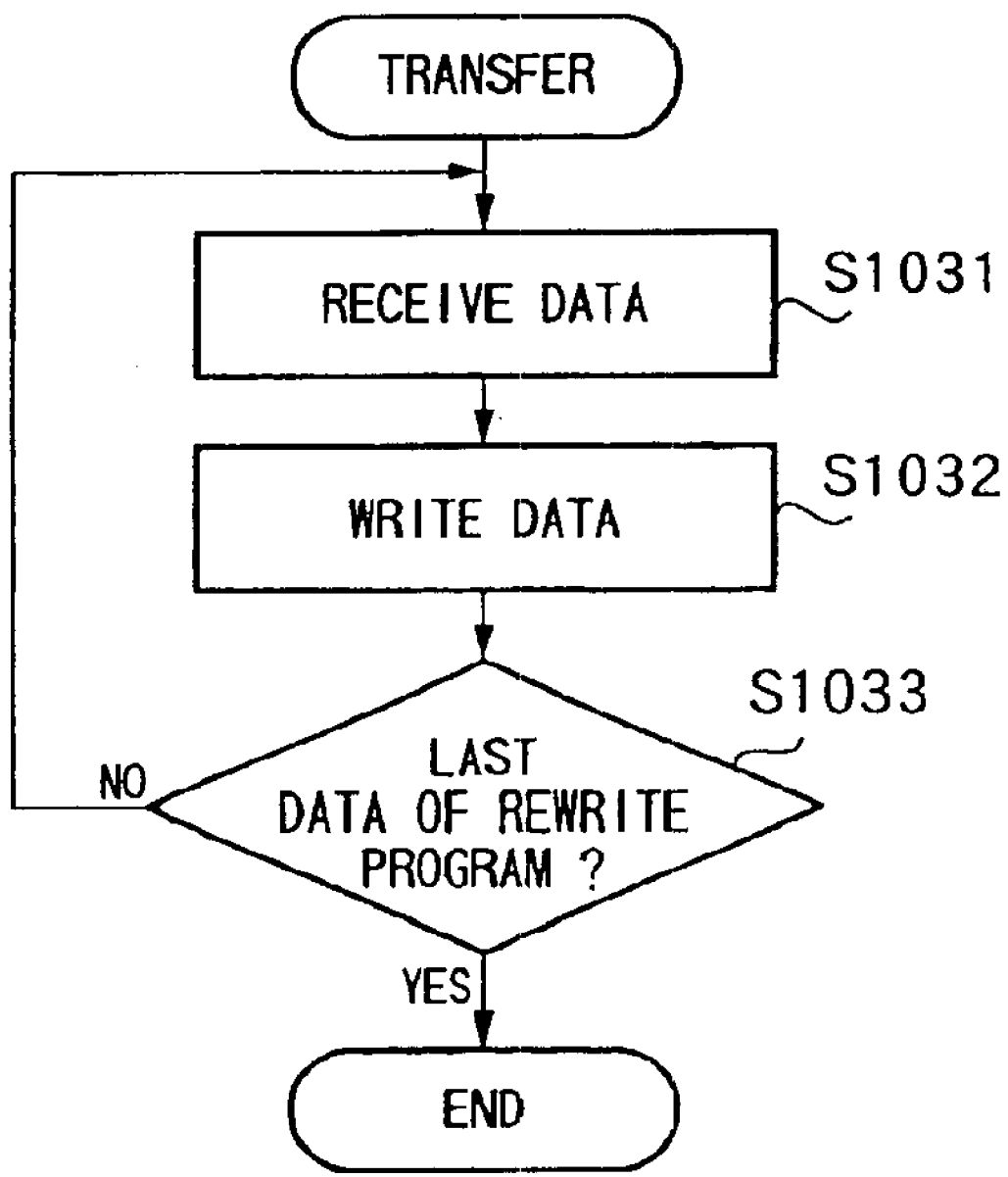
FIG. 5 is a flowchart showing a rewrite control program transfer process according to the first embodiment.

Details of control in above step S103 will now be described with reference to a flowchart of FIG. 5. When the rewrite program transfer mode is started, the data transmitted from the external apparatus is first received in step S1031. The control flow proceeds to step S1032 to write the received data in the RAM 1005 successively. It is then determined in step S1033 whether the received data is the last data to be transferred. If the received data is the last data, the rewrite program transfer process is ended and execution of the flash ROM rewrite mode is started. If the received data is not the last data, the control flow returns to step S1031 to repeat the above process.

Transfer of the rewrite program is performed through the process described above. In this connection, the built-in ROM 1019 stores therein a control program for transferring the rewrite program to the RAM 1005. Comparing with the case of directly storing, in the built-in ROM 1019, the rewrite program for rewriting the image forming control programs stored in a plurality of memory media, however, it is expected that the amount of program data to be stored in the built-in ROM 1019 is reduced considerably as a result of the above process of this embodiment. Correspondingly, it is also expected that a probability of bugs being present in the built-in ROM 1019 is reduced considerably.

Next, it is determined in step S104 which one of the flash ROMs 1004, 1008, 1015 is a destination of data installing. If the destination of data installing is the flash ROM 1004, the control flow proceeds to step S105 where the CPU 1001 erases data in a rewrite area of the flash ROM 1004. Then, the CPU 1001 sets information indicating that the data in the flash ROM was erased, and erases data at a predetermined address in the flash ROM from which information is read in above step S101. This enables the CPU to determine that the rewrite has suspended, when the data at the predetermined address is not definite. As an alternative, a flag indicating that the flash ROM is under execution of the rewrite may be set in a nonvolatile RAM.

Subsequently, the control flow proceeds to step S106 where the CPU waits for that rewrite data transmitted from the external apparatus is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S106, the control flow proceeds to step S107 where the compressed data codes are decompressed to original data.

Then, in step S108, the data decompressed in step S107 is written in the flash ROM 1004 at predetermined addresses. It is determined in subsequent step S109 whether the rewrite data has been completely written up to the last data. If the last data is not yet written, the control flow returns to step S106 to repeat the above process. If the rewrite data has been completely written up to the last data, the control flow proceeds to step S117 after clearing the aforesaid information indicating that the data in the flash ROM 1004 was erased.

In step S117, the check sum of the data in the flash ROM thus just rewritten is calculated to determine whether the rewrite has been normally ended. If the rewrite has been normally ended in S117, the rewrite process is ended. If the rewrite has not been normally ended, the control flow proceeds to S118 where information indicating the abnormal end is left, followed by ending the rewrite process. The information indicating the abnormal end may be written in the flash ROM at a predetermined address. As an alternative, that information may be written in a nonvolatile RAM.

If it is determined in above step S104 that the destination of data installing is the flash ROM 1008, the control flow proceeds to step S110 where the CPU 1001 instructs the CPU 1002 to erase data in a rewrite area of the flash ROM 1008 through the dual port RAM 1007. Using the same above-described manner as taken by the CPU 1001, the CPU 1002 sets information indicating that data in the flash ROM 1008 was erased, so that the set information can be referred to at the time of determining in above step S100 whether the rewrite of the flash ROM has suspended. Subsequently, the CPU 1001 waits for that rewrite data is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S110, the control flow proceeds to step S111 where the compressed data codes are decompressed to original data.

Then, in step S112, the data decompressed in step S111 is transferred to the CPU 1002 through the dual port RAM 1007. The CPU 1002 writes the data transmitted from the CPU 1001 through the dual port RAM 1007 in the flash ROM 1008 at predetermined addresses. After transmitting the data in step S112, the CPU 1001 proceeds to step S113.

It is determined in step S113 whether the rewrite data has been completely written up to the last data. If the last data is not yet written, the control flow returns to step S110 to repeat the above process. If it is determined in step S113 that the rewrite data has been completely written up to the last data, the CPU 1001 notifies the CPU 1002 of the fact that the last data has been written, and in response to such a notice, the CPU 1002 clears the aforesaid information indicating that the data in the flash ROM 1004 was erased. After that, the CPU 1001 proceeds to step S117 mentioned above.

If it is determined in above step S104 that the destination of data installing is the flash ROM 1015, the control flow proceeds to step S114 where the CPU 1001 presents display on the control panel 300 which informs the operator of the necessity of rewriting the flash ROM 1015. Then, the CPU 1001 instructs the CPU 1014 to erase data in a rewrite area of the flash ROM 1015 through the dual port RAM 1013. Using the same above-described manner as taken by the CPU 1001, the CPU 1014 sets information indicating that data in the flash ROM 1015 was erased, so that the set information can be referred to at the time of determining in above step S100 whether the rewrite of the flash ROM has suspended. Subsequently, the CPU 1001 waits for that rewrite data is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S114, the control flow proceeds to step S115.

In step S115, the received data is transferred to the CPU 1014 through the dual port RAM 1013. The CPU 1014 decompresses the data, transferred from the CPU 1001 through the dual port RAM 1013, to original data which is then written in the flash ROM 1015 at predetermined addresses. After transmitting the data in step S115, the CPU 1001 proceeds to step S116.

It is determined in step S116 whether the rewrite data has been completely written up to the last data. If the last data is not yet written, the control flow returns to step S114 to repeat the above process. If it is determined in step S116 that the rewrite data has been completely written up to the last data, the CPU 1001 notifies the CPU 1014 of the fact that the last data has been written, and in response to such a notice, the CPU 1014 clears the aforesaid information indicating that the data in the flash ROM 1015 was erased. After that, the CPU 1001 proceeds to step S117 mentioned above.

FIG. 6 shows an example of display indicated when the flash ROM 1004 is rewritten. As illustrated, instead of the normal display for copying setting, the control panel displays a message informing the operator of the fact that copying is disabled and the apparatus is under download of data into the flash ROM 1004. Also, when the flash ROMs 1008, 1015 are rewritten, a similar message to that shown in FIG. 6 is displayed on the control panel.

[Second Embodiment]

A second embodiment of the present invention will be described below in detail with reference to the drawings.

Note that a sectional structure of an image forming apparatus according to the second embodiment and a construction of a control panel of the apparatus are similar to those of the image forming apparatus according to the first embodiment shown in FIGS. 1 and 2; hence a description thereof is omitted here.

FIG. 8 is a block diagram showing a construction of a control system for an image forming apparatus 100 according to this second embodiment. In FIG. 8, reference numeral 1001 denotes a CPU for carrying out basic control of the entire apparatus. The CPU 1001 is connected, via an address bus and a data bus, to an input/output (I/O) port 1003, a flash ROM 1004 in which image forming control programs are written, a work RAM 1005 for use in execution of processing, a flash ROM 1000 in which a download program is stored, and a key/display control unit 1006 for controlling display on and key inputs from a control panel 300.

In addition, the CPU 1001 includes a built-in ROM 1019 in which a program for transferring a control program adapted to rewrite the flash ROM 1004, etc. based on data transmitted from an external apparatus, such as a host computer (personal computer), to the flash ROM 1000 is written. Also, the CPU 1001 has a plurally of operating modes which can be selectively set by an operating mode setting unit 1018. During the normal image forming operation, the CPU 1001 is set to the mode in which the built-in ROM 1019 is not effective.

In such a control system, the CPU 1001 executes input/output control successively in accordance with the contents of the flash ROM 1004 for carrying out the image forming operation, and also receives key-input information from the control panel 300 through the key/display control unit 1006. Further, the CPU 1001 instructs the key/-display control unit 1006 to indicate the operating states of the apparatus 100, the operating mode set in response to the key input, etc., thereby controlling display on the control panel 300.

The image forming apparatus 100 also includes another CPU 1002 for executing control of operations of various motors, heaters and so on. The operation control of the various motors, etc. is performed in accordance with instructions from the CPU 1002. The CPU 1002 is connected, via an address bus and a data bus, to a flash ROM 1008 in which control programs are written, a work RAM 1009 for use in execution of processing, and an input/-output (I/O) port 1010. Various control motors, etc. are connected to the input/output (I/O) port 1010 as needed. Additionally, the CPU 1002 executes data communication with the CPU 1001 through a dual port RAM 1007 serving as interface means.

Further, the CPU 1001 executes data communication with a CPU 1014 for converting data, such as PDL codes, which is transmitted from the external apparatus, into an image signal through a dual port RAM 1013 serving as interface means. Upon receiving the PDL codes from the external apparatus, the CPU 1014 converts the received PDL codes into image data, requests image forming processing to the CPU 1001, which is control means for an image forming section, through the dual port RAM 1013, and then outputs the image data to the printer section 2 in synch with control of the CPU 1001. The CPU 1014 is connected, via an address bus and a data bus, to a flash ROM 1015 in which control programs are written, a work RAM 1016 for use in execution of processing and for developing the PDL codes into the image data, and an input/output (I/O) port 1017. Note that the input/output port 1017 is connected to a control port through which data, such as PDL codes, is received from the external apparatus.

In addition, the CPU 1001 executes data communication with a not-shown external apparatus, such as a personal computer, through a serial interface (I/F) 1011. The CPU 1001 also analyzes data received from the external apparatus through the serial interface 1011, and transmits data in the apparatus 100 to the external apparatus in accordance with an analyzed result. Further, the CPU 1001 performs rewrite of data in the flash ROMs 1004, 1008, 1015 based on data received from the external apparatus.

Figure 9:
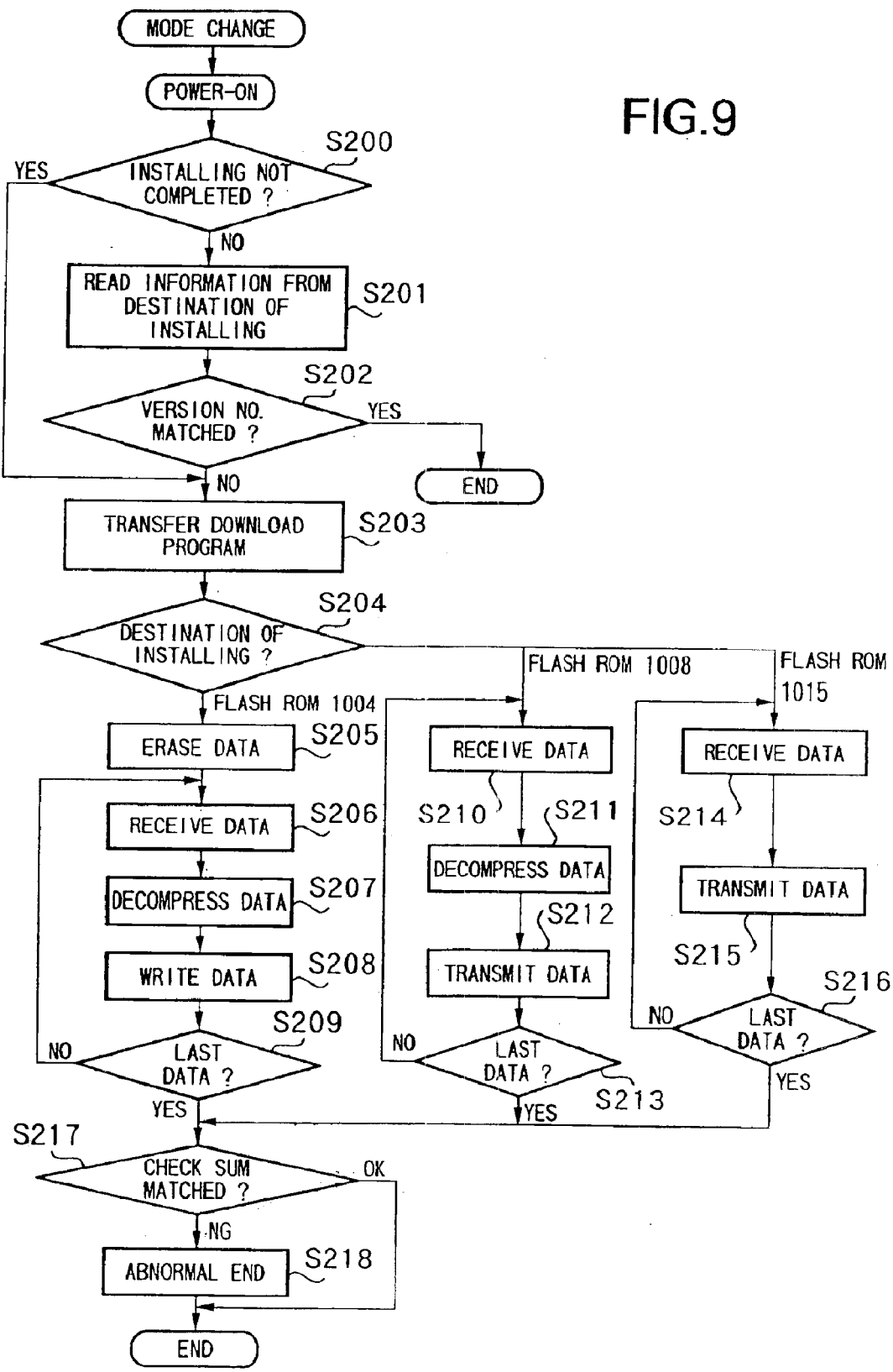
FIG. 9 is a flowchart showing a data rewrite process in a flash ROM according to the second embodiment.
Figure 11A:
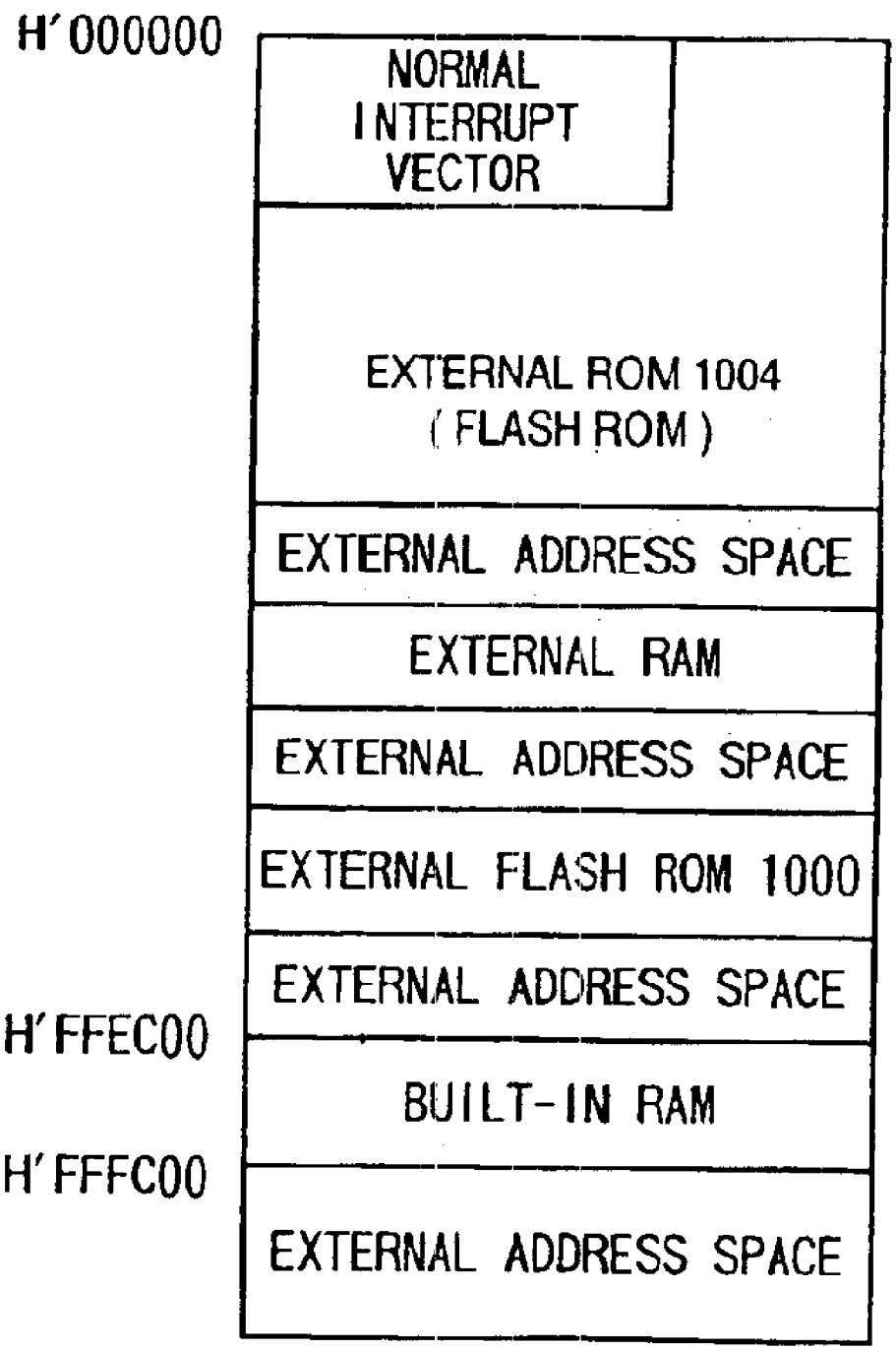
FIGS. 11A and 11B are each a representation showing a memory map according to the second embodiment.
Figure 11B:
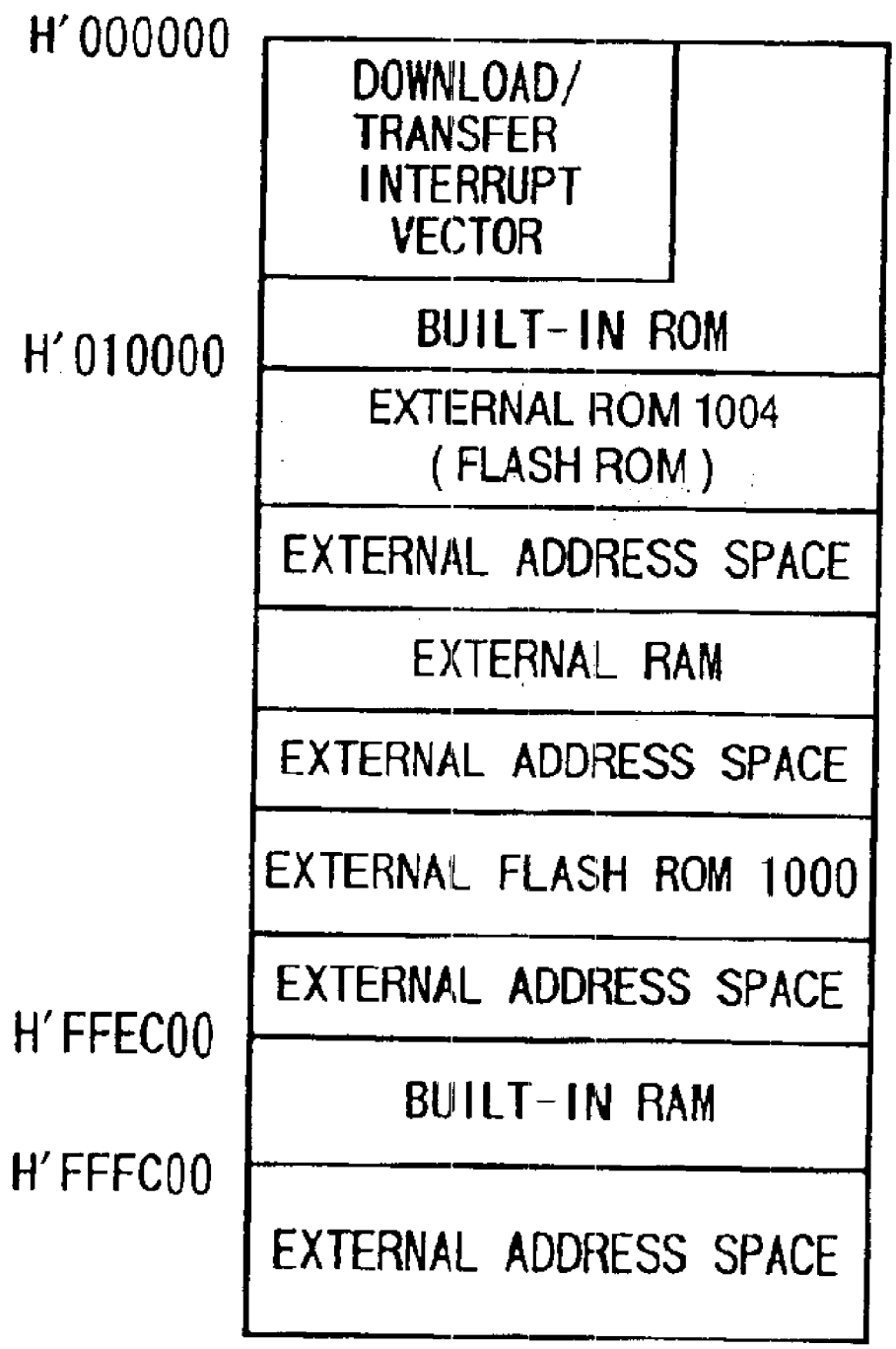

A process for rewriting data in the flash ROMs 1004, 1008, 1015 will be described below. FIG. 9 is a flowchart showing the data rewrite process in each flash ROM according to this second embodiment. This process is performed by the CPUs 1001, 1002, 1014 when a power supply is turned on in a state where the built-in ROM 1019 is made effective. More specifically, when the data rewrite process is desired, this process is started and executed as described below by operating a dip switch or the like in a state where the power supply is not turned on, thereby establishing a mode in which the built-in ROM 1019 is effective, and thereafter turning on the power supply. In this connection, FIG. 11A shows a memory map used in the normal image forming operation, i.e., a memory map used for the execution of processing in the mode in which the built-in ROM 1019 is made not effective, and FIG. 11B shows a memory map used in the rewrite control operation, i.e., a memory map used for the execution of processing in the mode in which the built-in ROM 1019 is made effective. In other words, FIG. 11A shows a memory map used in a normal process to carry out the operation of a copying machine or a printer, and FIG. 11B shows a memory map used in a download process.

As will be seen from FIGS. 11A and 11B, part of the memory area assigned to the flash ROM in the mode in which the built-in ROM 1019 is not effective, is assigned to the built-in ROM 1019 in the mode in which the built-in ROM 1019 is effective. In the illustrated example, addresses from 000000h to 010000h represent an area shared by both the modes. Further, the shared area includes in its part a normal interrupt vector area in the mode in which the built-in ROM 1019 is not effective, and a transfer/-download vector area in the mode in which the built-in ROM 1019 is effective. Stated otherwise, the same memory space is occupied by the flash ROM during the image forming operation and by the built-in ROM during the rewrite control operation, thus enabling a vector area dedicated for the rewrite control to be ensured.

The reason why part of the shared memory area is provided as the transfer/download vector area in the illustrated example is that the memory is used upon an interrupt substantially in the same range for transfer to the flash ROM 1000, and therefore a common vector area can be used in both transfer and download.

Returning to FIG. 9, when execution of the rewrite control program is started, i.e., when in this embodiment the power supply is turned on in the mode in which the built-in ROM is effective, the operator is informed of the fact that the apparatus is under the rewrite process and the image forming operation cannot be effected.

First, in step S200, it is determined in accordance with information described below whether the rewrite or rewrite process of each of the flash ROMs 1004, 1008, 1015 has suspended or failed. If the rewrite of the flash ROMs 1008, 1015 has suspended, information indicating the suspension is noticed from the CPUs 1002, 1014 to the CPU 1001 through the dual port RAMs 1007, 1013. When the rewrite is determined as having suspended in response to the above notice, this means that the control data in each flash ROM is in a state not ensured. Therefore, the control flow proceeds to step S203 described later for executing a rewrite program transfer mode. Incidentally, how to determine whether the rewrite of the flash ROM 1004 has suspended will be described later.

On the other hand, if it is determined in step S200 that the rewrite has not suspended, the control flow proceeds to step S201 to read information in the flash ROM which is a destination of data installing in an install mode. In subsequent step S202, the read version is compared with the version to be newly installed. If both the versions are in match with each other, there is no need of installing data. Therefore, the CPU indicates the end of the install mode to the operator, and also prompts the operator to turn off the power supply and to set the mode back to the mode in which the built-in ROM is not effective. However, if both the versions are not in match with each other in step S202, the control flow proceeds to step S203 to execute the rewrite program transfer mode.

In step S203, in accordance with the contents of the built-in ROM 1019, a rewrite program is transferred to the flash ROM 1000 based on data transmitted from the external apparatus. After that, the control flow proceeds to step S204 to execute a flash ROM rewrite mode.

Figure 10:
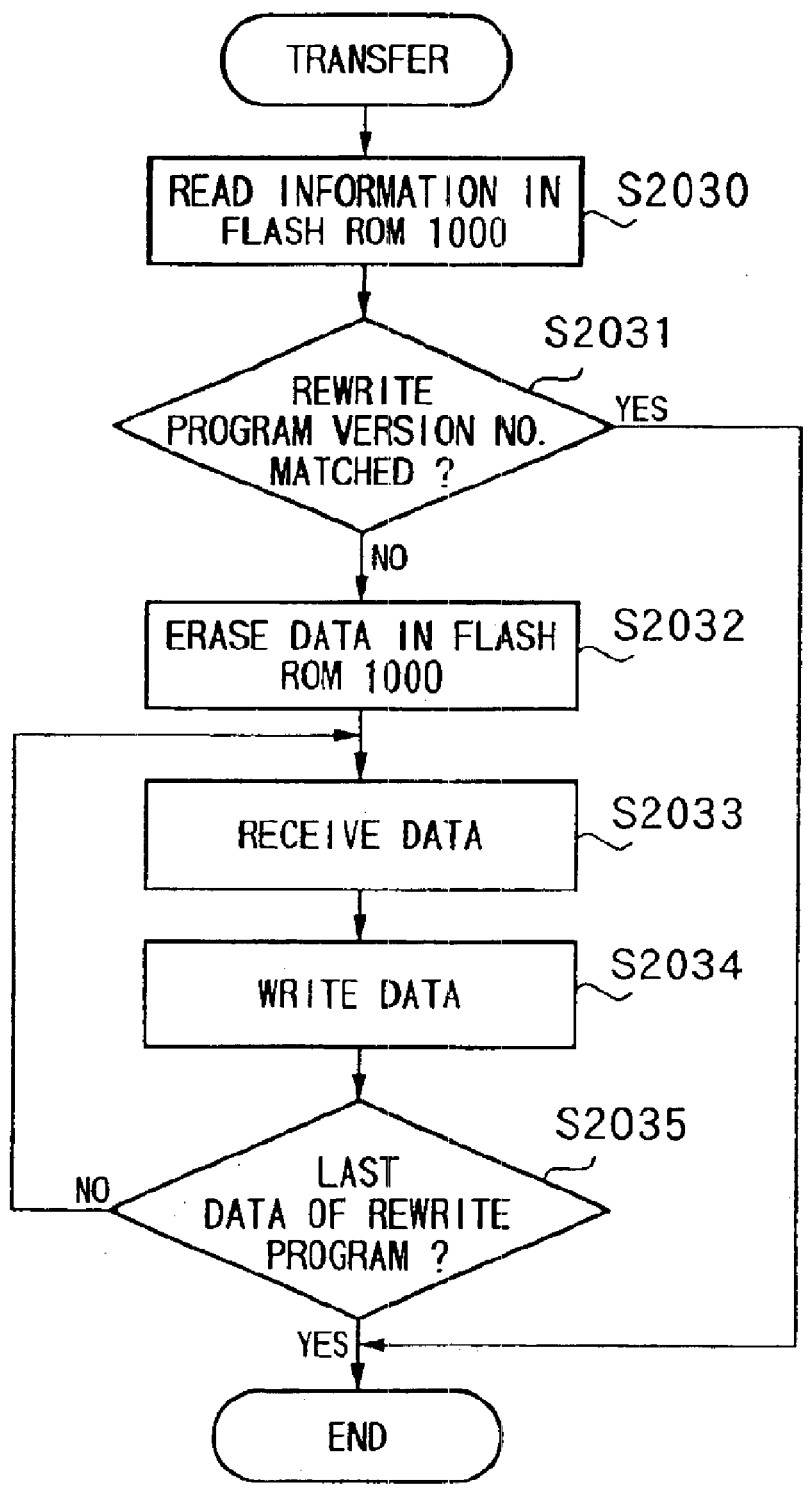
FIG. 10 is a flowchart showing a rewrite control program transfer process according to the second embodiment.

Details of control in above step S203 will now be described with reference to a flowchart of FIG. 10. When the rewrite program transfer mode is started, the contents of information in the flash ROM are first read in step S2031 for comparison of the stored version with the version to be installed. If both the versions are in match with each other, the control flow proceeds to step S204 after informing the external apparatus of the fact that there is no need of transferring the rewrite program. If both the versions are not in match with each other, the control flow proceeds to step S2032 to erase data in the flash ROM 1000. In subsequent step S2033, the CPU 1001 waists for reception of data from the external apparatus. After receiving the data, If both the versions are in match with each other, the control flow proceeds to step S2034 to write the data in accordance with signals received by the flash ROM 1000. Then, it is determined in step S2035 whether the received data is the last data to be transferred. If the received data is the last data, the control flow proceeds to step S204 to execute the flash ROM rewrite mode. If the received data is not the last data, the control flow returns to step S2033 to repeat the above process.

In this connection, the built-in ROM 1019 stores therein a control program for transferring the rewrite program to the flash ROM 1000. Comparing with the case of directly storing, in the built-in ROM 1019, the rewrite program for rewriting the image forming control programs stored in a plurality of memory media, however, it is expected that the amount of program data to be stored in the built-in ROM 1019 is reduced considerably as a result of the above process of this embodiment. Correspondingly, it is also expected that a probability of bugs being present in the built-in ROM 1019 is reduced considerably.

Next, it is determined in step S204 which one of the flash ROMs 1004, 1008, 1015 is a data destination of installing. If the destination of data installing is the flash ROM 1004, the control flow proceeds to step S205 where the CPU 1001 erases data in a rewrite area of the flash ROM 1004. Then, the CPU 1001 sets information indicating that the data in the flash ROM was erased, and erases data at a predetermined address in the flash ROM from which information is read in above step S201. This enables the CPU to determine that the rewrite has suspended, when the data at the predetermined address is not definite. As an alternative, a flag indicating that the flash ROM is under execution of the rewrite may be set in a nonvolatile RAM.

Subsequently, the control flow proceeds to step S206 where the CPU waits for that rewrite data transmitted from the external apparatus is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S206, the control flow proceeds to step S207 where the compressed data codes are decompressed to original data.

Then, in step S208, the data decompressed in step S207 is written in the flash ROM 1004 at predetermined addresses. It is determined in subsequent step S209 whether the rewrite data has been completely written up to the last data. If the last data is not yet written, the control flow returns to step S206 to repeat the above process. If the rewrite data has been completely written up to the last data, the control flow proceeds to step S217 after clearing the aforesaid information indicating that the data in the flash ROM 1004 was erased.

In step S217, the check sum of the data in the flash ROM thus just rewritten is calculated to determine whether the rewrite has been normally ended. If the rewrite has been normally ended in S217, the rewrite process is ended. If the rewrite has not been normally ended, the control flow proceeds to S218 where information indicating the abnormal end is left, followed by ending the rewrite process. The information indicating the abnormal end may be written in the flash ROM at a predetermined address. As an alternative, that information may be written in a nonvolatile RAM.

If it is determined in above step S204 that the destination of data installing is the flash ROM 1008, the control flow proceeds to step S210 where the CPU 1001 instructs the CPU 1002 to erase data in a rewrite area of the flash ROM 1008 through the dual port RAM 1007. Using the same above-described manner as taken by the CPU 1001, the CPU 1002 sets information indicating that data in the flash ROM 1008 was erased, so that the set information can be referred to at the time of determining in above step S200 whether the rewrite of the flash ROM has suspended. Subsequently, the CPU 1001 waits for that rewrite data is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S210, the control flow proceeds to step S211 where the compressed data codes are decompressed to original data.

Then, in step S212, the data decompressed in step S211 is transferred to the CPU 1002 through the dual port RAM 1007. The CPU 1002 writes the data transmitted from the CPU 1001 through the dual port RAM 1007 in the flash ROM 1008 at predetermined addresses. After transmitting the data in step S212, the CPU 1001 proceeds to step S213.

It is determined in step S213 whether the rewrite data has been completely written up to the last data. If the last data is not yet written, the control flow returns to step S210 to repeat the above process. If it is determined in step S213 that the rewrite data has been completely written up to the last data, the CPU 1001 notifies the CPU 1002 of the fact that the last data has been written, and in response to such a notice, the CPU 1002 clears the aforesaid information indicating that the data in the flash ROM 1008 was erased. After that, the CPU 1001 proceeds to step S217 mentioned above.

If it is determined in above step S204 that the destination of data installing is the flash ROM 1015, the control flow proceeds to step S214 where the CPU 1001 presents display on the control panel 300 which informs the operator of the necessity of rewriting the flash ROM 1015. Then, the CPU 1001 instructs the CPU 1014 to erase data in a rewrite area of the flash ROM 1015 through the dual port RAM 1013. Using the same above-described manner as taken by the CPU 1001, the CPU 1014 sets information indicating that data in the flash ROM 1015 was erased, so that the set information can be referred to at the time of determining in above step S200 whether the rewrite of the flash ROM has suspended. Subsequently, the CPU 1001 waits for that rewrite data is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S214, the control flow proceeds to step S215.

In step S215, the received data is transferred to the CPU 1014 through the dual port RAM 1013. The CPU 1014 decompresses the data, transferred from the CPU 1001 through the dual port RAM 1013, to original data which is then written in the flash ROM 1015 at predetermined addresses. After transmitting the data in step S215, the CPU 1001 proceeds to step S216.

It is determined in step S216 whether the rewrite data has been completely written up to the last data. If the last data is not yet written, the control flow returns to step S214 to repeat the above process. If it is determined in step S216 that the rewrite data has been completely written up to the last data, the CPU 1001 notifies the CPU 1014 of the fact that the last data has been written, and in response to such a notice, the CPU 1014 clears the aforesaid information indicating that the data in the flash ROM 1015 was erased. After that, the CPU 1001 proceeds to step S217 mentioned above.

Also in this second embodiment, as with the first embodiment, instead of the normal display for copying setting, the control panel displays a message, as shown in FIG. 6, informing the operator of the fact that copying is disabled and the apparatus is under download of data into the flash ROM 1004. Further, when the flash ROMs 1008, 1015 are rewritten, a similar message is displayed on the control panel.

While the second embodiment has been described as presenting display, which indicates that the flash ROM 1004, 1008 or 1015 is under execution of the rewrite, in the display section 301 of the control panel 300, an indicator lamp showing a state under execution of the rewrite when blinked, for example, may be disposed on the control panel 300 or any position on the image forming apparatus that can be easily viewed by the operator for confirmation. In such a case, for example, an LED is disposed on the control panel 300 and is turned off in a normal state. Then, the LED is turned on when the rewrite process of the flash ROM is failed. Under execution of the rewrite process, the LED is blinked.

Moreover, instead of using the display means of the image forming apparatus, such as the control panel 300, to display the state of the flash ROM, such display may be presented on a host connected for rewriting the flash ROM. In this case, instead of the process for presenting display on the control panel 300, the CPU 1001 informs the necessity of rewriting the flash ROM to the host through the serial interface 1011 in the form of RS-232C. The host then displays the informed notice on its image screen.

While the flash ROM is used as rewritable memory means in the second embodiment, any other suitable memory means such as a hard disk can also be similarly employed instead of the flash ROM.

According to the second embodiment, as described above, a program for transferring a download program is built in a ROM or the like, and control programs for the image forming operation are rewritten by executing the transferred download program. Information stored in a flash ROM slightly tends to be unstable, and the contents of control programs for the image forming operation become possibly not normal when they are stored in a flash ROM. This means that if the download program is stored in a flash ROM, there is a possibility that the download program is also not normal. In the case of the download program being not normal, the contents of the flash ROM cannot be restored in a way other than replacing it. With the second embodiment, since the download program is transferred in accordance with the program stored in a ROM or the like and the transferred download program is executed, the contents of the flash ROM can be restored even if they have become not normal.

Additionally, where the download program is directly stored in a ROM or the like, programs for rewriting a plurality of flash ROMs must be stored in the ROM, thus resulting in a large amount of program data stored in the ROM. By contrast, with the second embodiment, since a ROM stores therein just a program for transferring data, transmitted from the external apparatus, to a memory in a main CPU, the amount of program data is held down to a minimum. It is hence possible to suppress a probability that there are bugs in the program stored in the ROM, and to minimize a burden imposed on a ROM which must be replaced if bugs are found in it.

[Third Embodiment]

A third embodiment of the present invention will be described below in detail with reference to the drawings.

Note that a sectional structure of an image forming apparatus according to the third embodiment and a construction of a control panel of the apparatus are similar to those of the image forming apparatus according to the second embodiment shown in FIGS. 1 and 2; hence a description thereof is omitted here.

Figure 12:
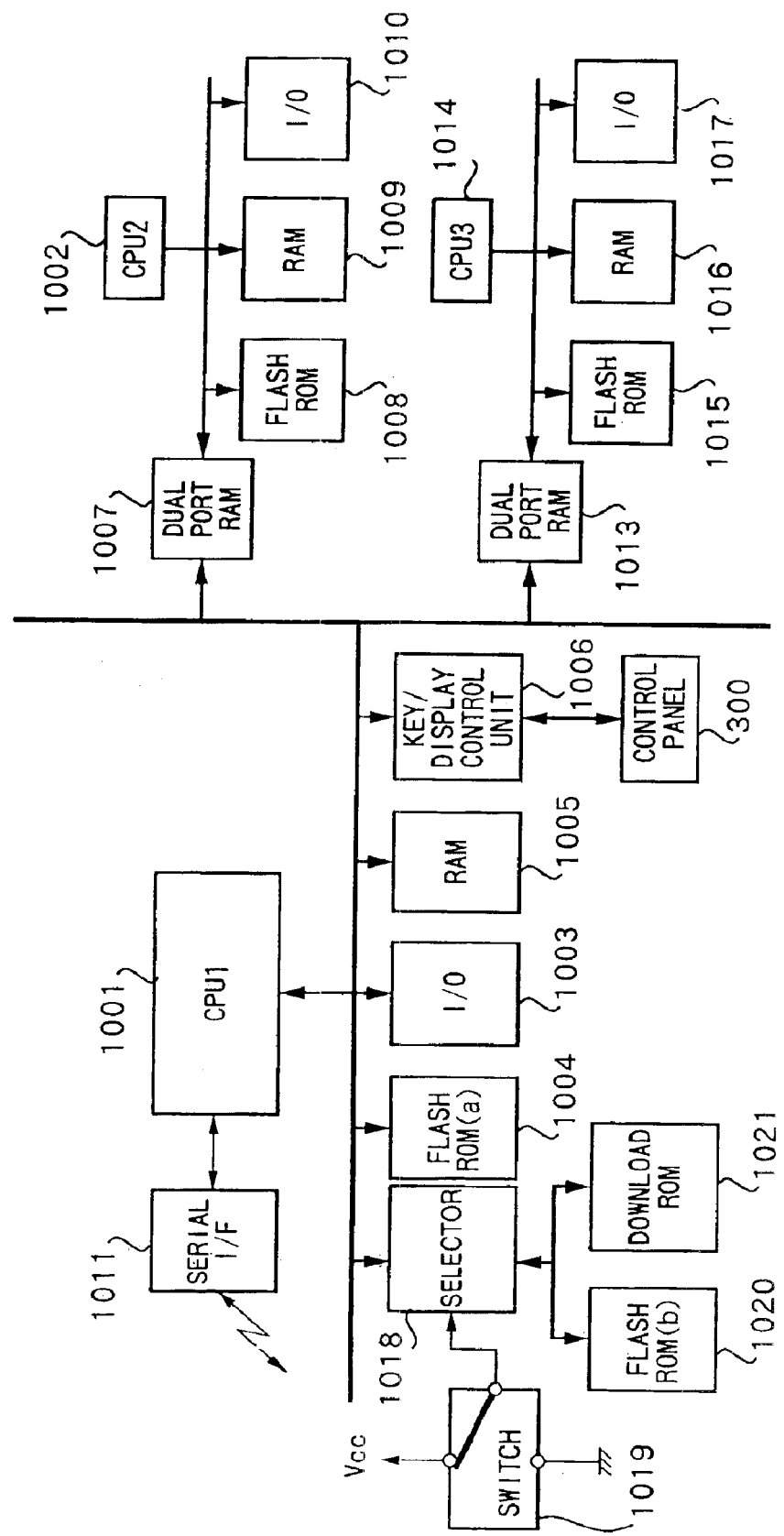
FIG. 12 is a block diagram showing a construction of a control system for an image forming apparatus according to a third embodiment.

FIG. 12 is a block diagram showing a construction of a control system for an image forming apparatus 100 according to this third embodiment. In FIG. 12, reference numeral 1001 denotes a CPU for carrying out basic control of the entire apparatus. The CPU 1001 is connected, via an address bus and a data bus, to an input/output (I/O) port 1003, a flash ROM(a) 1004 in which image forming control programs are written, a selector 1018 for selecting either a download ROM 1021 in which a download program is written or a flash ROM(b) 1020 which includes an interrupt vector area for use in the image forming operation, a work RAM 1005 for use in execution of processing, and a key/display control unit 1006 for controlling display on and key inputs from a control panel 300.

In addition, the CPU 1001 includes a switch 1019 changed over so that either the download ROM 1021 in which the download program is written or the flash ROM(b) 1020 which includes the interrupt vector area for use in the image forming operation is made effective through the selector 1018. The change-over of the switch 1019 is set to make effective the flash ROM(b) 1020 which includes the interrupt vector area, when the apparatus is under the normal image forming operation. This change-over control will be described later.

In such a control system, the CPU 1001 executes input/output control successively in accordance with the contents of the flash ROM for carrying out the image forming operation, and also receives key-input information from the control panel 300 through the key/display control unit 1006. Further, the CPU 1001 instructs the key/display control unit 1006 to indicate the operating states of the apparatus 100, the operating mode set in response to the key input, etc., thereby controlling display on the control panel 300.

The image forming apparatus 100 also includes another CPU 1002 for executing control of operations of various motors, heaters and so on. The operation control of the various motors, etc. is performed in accordance with instructions from the CPU 1002. The CPU 1002 is connected, via an address bus and a data bus, to a flash ROM 1008 in which control programs are written, a work RAM 1009 for use in execution of processing, and an input/-output (I/O) port 1010. Various control motors, etc. are connected to the input/output (I/O) port 1010 as needed. Additionally, the CPU 1002 executes data communication with the CPU 1001 through a dual port RAM 1007 serving as interface means.

Further, the CPU 1001 executes data communication with a CPU 1014 for converting data, such as PDL codes, which is transmitted from an external apparatus such as a host computer (personal computer), into an image signal through a dual port RAM 1013 serving as interface means. Upon receiving the PDL codes from the external apparatus, the CPU 1014 converts the received PDL codes into image data, requests image forming processing to the CPU 1001, which is control means for an image forming section, through the dual port RAM 1013, and then outputs the image data to the printer section 2 in synch with control of the CPU 1001. The CPU 1014 is connected, via an address bus and a data bus, to a flash ROM 1015 in which control programs are written, a work RAM 1016 for use in execution of processing and for developing the PDL codes into the image data, and an input/output (I/O) port 1017. Note that the input/output (I/O) port 1017 is connected to a control port through which data, such as PDL codes, is received from the external apparatus.

In addition, the CPU 1001 executes data communication with a not-shown external apparatus, such as a personal computer, through a serial interface (I/F) 1011. The CPU 1001 also analyzes data received from the external apparatus through the serial interface 1011, and transmits data in the apparatus 100 to the external apparatus in accordance with an analyzed result. Further, the CPU 1001 performs rewrite of data in the flash ROMs 1004, 1008, 1015 based on data received from the external apparatus.

A process for rewriting data in the flash ROMs 1004, 1008, 1015 will be described below. FIG. 13 is a flowchart showing the data rewrite process in each flash ROM according to this third embodiment. This process is performed by the CPU 1001 when a power supply is turned on in a state where the download ROM 1021 is made effective with operation of the switch 1019. More specifically, when the data rewrite process is desired, this process is started and executed as described below by setting the switch 1019 to make effective the download ROM 1021 in a state where the power supply is not turned on, and thereafter turning on the power supply. In this connection, FIG. 14A shows a memory map used in the normal image forming operation, i.e., a memory map used for the execution of processing when the flash ROM(b) 1020 is made effective, and FIG. 14B shows a memory map used in the rewrite control operation, i.e., a memory map used for the execution of processing when the download ROM 1021 is made effective.

Figure 14A:
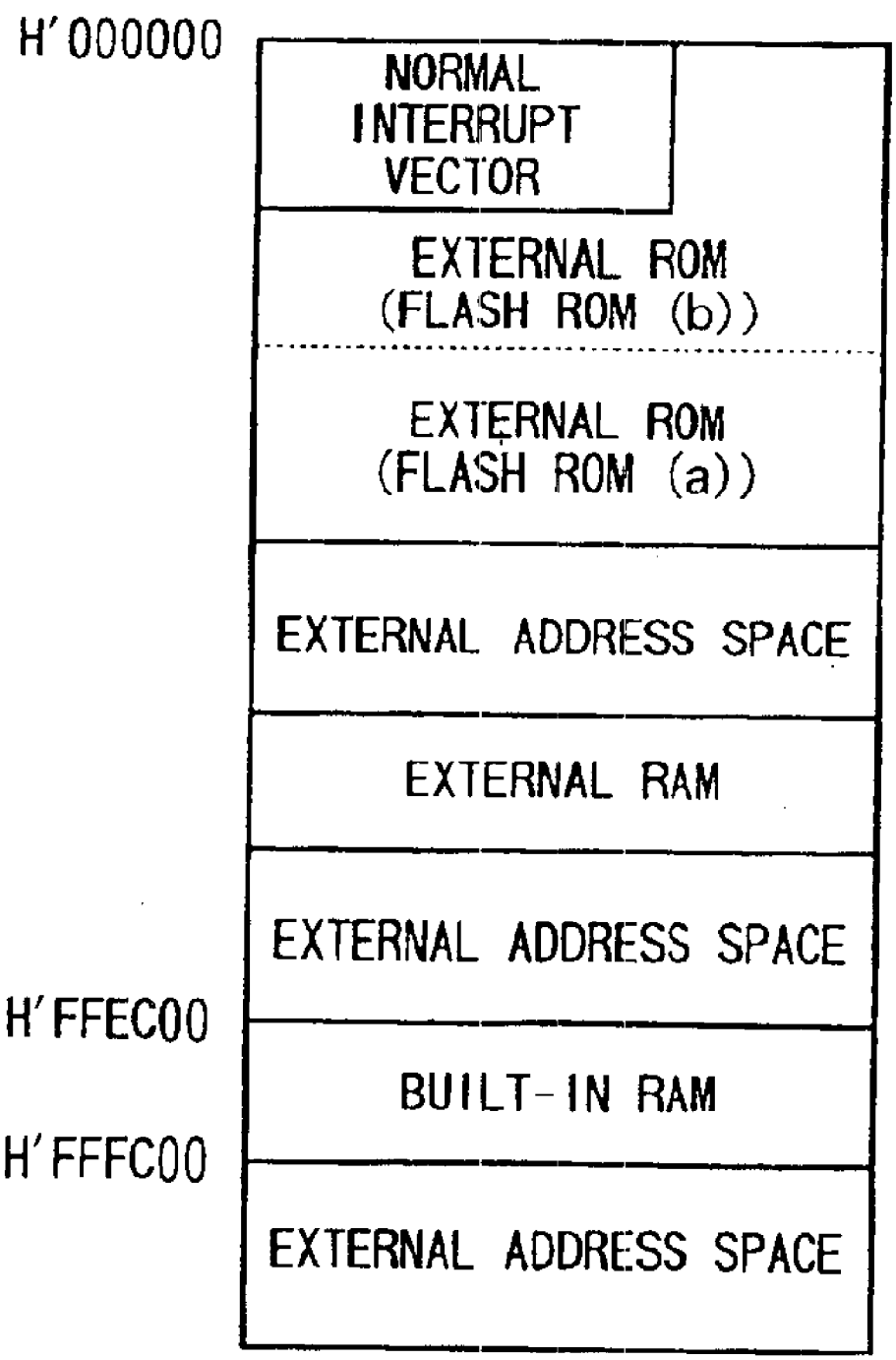
FIGS. 14A and 14B is a representation showing a memory map according to the third embodiment.
Figure 14B:
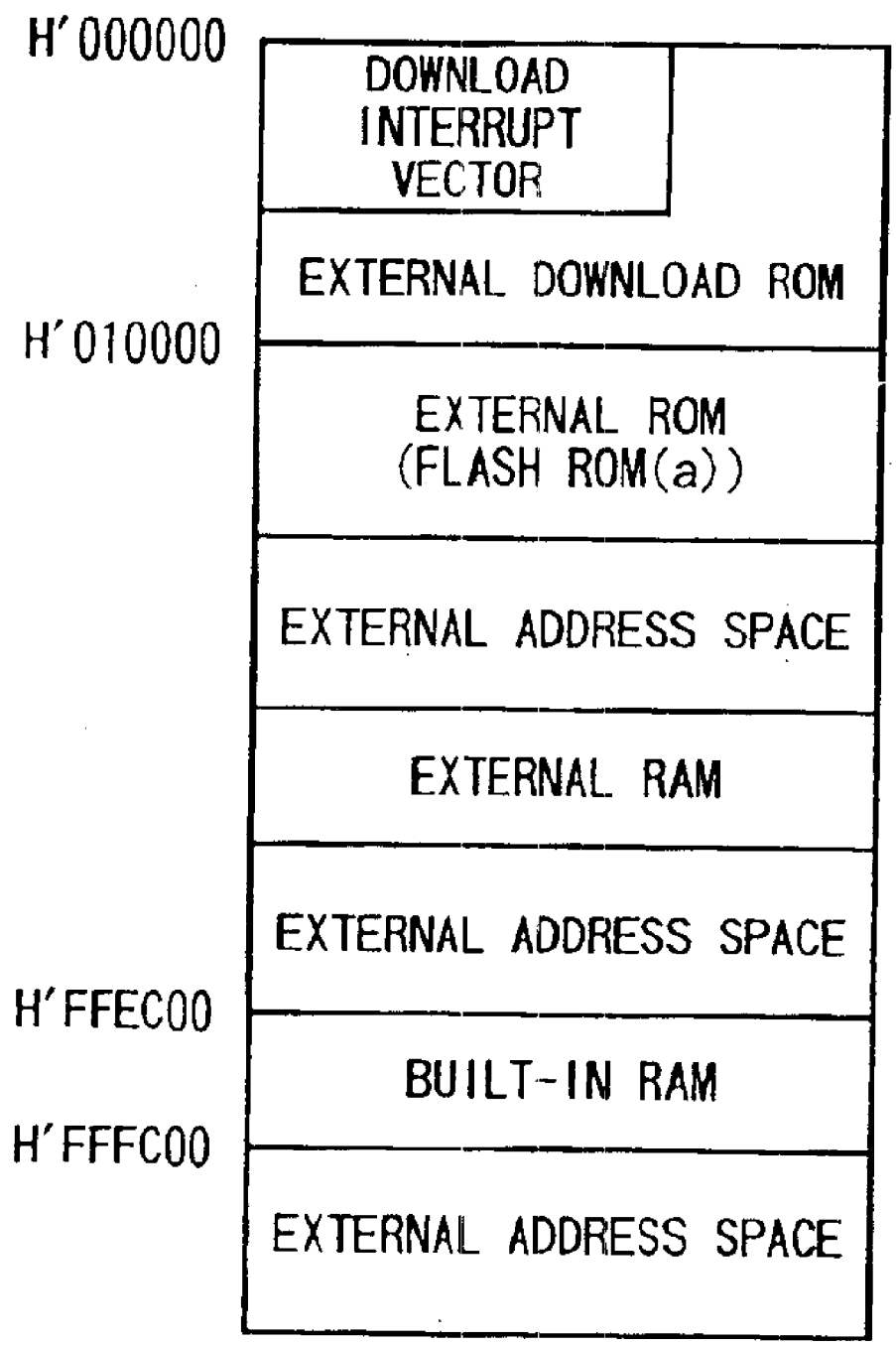

As will be seen from FIGS. 14A and 14B, part of the memory area assigned to the flash ROM(b) 1020 during the normal image forming operation, is assigned to the download ROM 1021 during the rewrite control operation. In the illustrated example, addresses from 000000h to 010000h represent an area shared by both the ROMs. Further, the shared area includes in its part a normal interrupt vector area during the normal image forming operation, and a download vector area during the rewrite control operation. Stated otherwise, the same memory space is occupied by the flash ROM during the image forming operation and by the download ROM during the rewrite control operation, thus enabling a vector area dedicated for the rewrite control to be ensured.

Returning to FIG. 13, when execution of the rewrite control program is started, i.e., when in this embodiment the power supply is turned on in a state where the switch 1019 is changed over to make the download ROM effective, the operator is informed of the fact that the apparatus is under the rewrite process and the image forming operation cannot be effected.

First, in step S301, it is determined in accordance with information described below whether the rewrite or rewrite process of each of the flash ROMs 1004, 1008, 1015 has suspended or failed. If the rewrite of the flash ROMs 1008, 1015 has suspended, information indicating the suspension is noticed from the CPUs 1002, 1014 to the CPU 1001 through the dual port RAMs 1007, 1013. When the rewrite is determined as having suspended in response to the above notice, this means that the control data in each flash ROM is in a state not ensured. Therefore, the control flow proceeds to step S304 described later for executing a flash ROM rewrite mode. Incidentally, how to determine whether the rewrite of the flash ROM 1004 has suspended will be described later.

On the other hand, if it is determined in step S301 that the rewrite has not suspended, the control flow proceeds to step S302 to read information in the flash ROM which is a destination of data installing in an install mode. In subsequent step S303, the read version is compared with the version to be newly installed. If both the versions are in match with each other, there is no need of installing data. Therefore, the CPU indicates the end of the install mode to the operator, and also prompts the operator to turn off the power supply and to change over the switch 1019 for setting the flash ROM(b) to be effective. However, if both the versions are not in match with each other in step S303, the control flow proceeds to step S304 to execute the flash ROM rewrite mode.

Next, it is determined in step S304 which one of the flash ROMs 1004, 1008, 1015 is a destination of data installing. If the destination of data installing is the flash ROM 1004, the control flow proceeds to step S305 where the CPU 1001 erases data in a rewrite area of the flash ROM 1004. Then, the CPU 1001 sets information indicating that the data in the flash ROM was erased, and erases data at a predetermined address in the flash ROM from which information is read in above step S301. This enables the CPU to determine that the rewrite has suspended, when the data at the predetermined address is not definite. As an alternative, a flag indicating that the flash ROM is under execution of the rewrite may be set in a nonvolatile RAM.

Subsequently, the control flow proceeds to step S306 where the CPU waits for that rewrite data transmitted from the external apparatus is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S306, the control flow proceeds to step S307 where the compressed data codes are decompressed to original data.

Then, in step S308, the data decompressed in step S307 is written in the flash ROM 1004 at predetermined addresses. It is determined in subsequent step S309 whether the rewrite data has been completely written up to the last data. If the last data is not yet written, the control flow returns to step S306 to repeat the above process. If the rewrite data has been completely written up to the last data, the control flow proceeds to step S317 after clearing the aforesaid information indicating that the data in the flash ROM 1004 was erased.

In step S317, the check sum of the data in the flash ROM thus just rewritten is calculated to determine whether the rewrite has been normally ended. If the rewrite has been normally ended in S317, the rewrite process is ended. If the rewrite has not been normally ended, the control flow proceeds to S318 where information indicating the abnormal end is left, followed by ending the rewrite process. The information indicating the abnormal end may be written in the flash ROM at a predetermined address. As an alternative, that information may be written in a nonvolatile RAM.

If it is determined in above step S304 that the destination of data installing is the flash ROM 1008, the control flow proceeds to step S310 where the CPU 1001 instructs the CPU 1002 to erase data in a rewrite area of the flash ROM 1008 through the dual port RAM 1007. Using the same above-described manner as taken by the CPU 1001, the CPU 1002 sets information indicating that data in the flash ROM 1008 was erased, so that the set information can be referred to at the time of determining in above step S301 whether the rewrite of the flash ROM has suspended. Subsequently, the CPU 1001 waits for that rewrite data is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S310, the control flow proceeds to step S311 where the compressed data codes are decompressed to original data.

Then, in step S312, the data decompressed in step S311 is transferred to the CPU 1002 through the dual port RAM 1007. The CPU 1002 writes the data transmitted from the CPU 1001 through the dual port RAM 1007 in the flash ROM 1008 at predetermined addresses. After transmitting the data in step S312, the CPU 1001 proceeds to step S313.

It is determined in step S313 whether the rewrite data has been completely written up to the last data. If the last data is not yet written, the control flow returns to step S310 to repeat the above process. If it is determined in step S313 that the rewrite data has been completely written up to the last data, the CPU 1001 notifies the CPU 1002 of the fact that the last data has been written, and in response to such a notice, the CPU 1002 clears the aforesaid information indicating that the data in the flash ROM 1008 was erased. After that, the CPU 1001 proceeds to step S317 mentioned above.

If it is determined in above step S304 that the destination of data installing is the flash ROM 1015, the control flow proceeds to step S314 where the CPU 1001 presents display on the control panel 300 which informs the operator of the necessity of rewriting the flash ROM 1015. Then, the CPU 1001 instructs the CPU 1014 to erase data in a rewrite area of the flash ROM 1015 through the dual port RAM 1013. Using the same above-described manner as taken by the CPU 1001, the CPU 1014 sets information indicating that data in the flash ROM 1015 was erased, so that the set information can be referred to at the time of determining in above step S301 whether the rewrite of the flash ROM has suspended. Subsequently, the CPU 1001 waits for that rewrite data is received through the serial interface 1011. The rewrite data transmitted from the external apparatus is divided in units of amount which can be processed in the apparatus at a time, e.g., in units of 256 bytes. Also, to shorten a transfer time, the rewrite data is transmitted in the form compressed to shorter data codes. The data compression is performed in accordance with Lempel-Ziv coding, for example. Thereafter, when the rewrite data is received in step S314, the control flow proceeds to step S315.

In step S315, the received data is transferred to the CPU 1014 through the dual port RAM 1013. The CPU 1014 decompresses the data, transferred from the CPU 1001 through the dual port RAM 1013, to original data which is then written in the flash ROM 1015 at predetermined addresses. After transmitting the data in step S315, the CPU 1001 proceeds to step S316.

It is determined in step S316 whether the rewrite data has been completely written up to the last data. If the last data is not yet written, the control flow returns to step S314 to repeat the above process. If it is determined in step S316 that the rewrite data has been completely written up to the last data, the CPU 1001 notifies the CPU 1014 of the fact that the last data has been written, and in response to such a notice, the CPU 1014 clears the aforesaid information indicating that the data in the flash ROM 1015 was erased. After that, the CPU 1001 proceeds to step S317 mentioned above.

Also in this third embodiment, as with the first embodiment, instead of the normal display for copying setting, the control panel displays a message, as shown in FIG. 6, informing the operator of the fact that copying is disabled and the apparatus is under download of data into the flash ROM 1004. Further, when the flash ROMs 1008, 1015 are rewritten, a similar message is displayed on the control panel.

According to the third embodiment described above, the rewrite process can be performed in a manner of interrupt. Therefore, when data is transmitted, the rewrite process can be started as an interrupt process at once and a processing time required for rewrite can be shortened. Information stored in a flash ROM slightly tends to be unstable. This means that if the contents of a flash ROM have become not normal, the rewrite control program may be impossible to execute when it is stored in the same flash ROM. With the third embodiment, since the rewrite program is stored in a ROM, it can be executed at any time regardless of the contents of a flash ROM, and even if the contents of the flash ROM have become not normal, they can be restored to a normal state.

As described hereinabove, according to the first to third embodiments, since a control program for just transferring the download program to a RAM or a flash ROM is stored in a ROM or the like, and the rewrite process is performed by executing the transferred download program, it is possible to minimize the amount of program data to be stored in the ROM or the like, and to improve the reliability.

Further, according to the first to third embodiments, the rewrite process can be achieved at a high speed because the interrupt is allowed in not only the image forming process, but also the rewrite process.

[Fourth Embodiment]

A fourth embodiment of the present invention will be described with reference to FIGS. 15 and 16.

Figure 16:
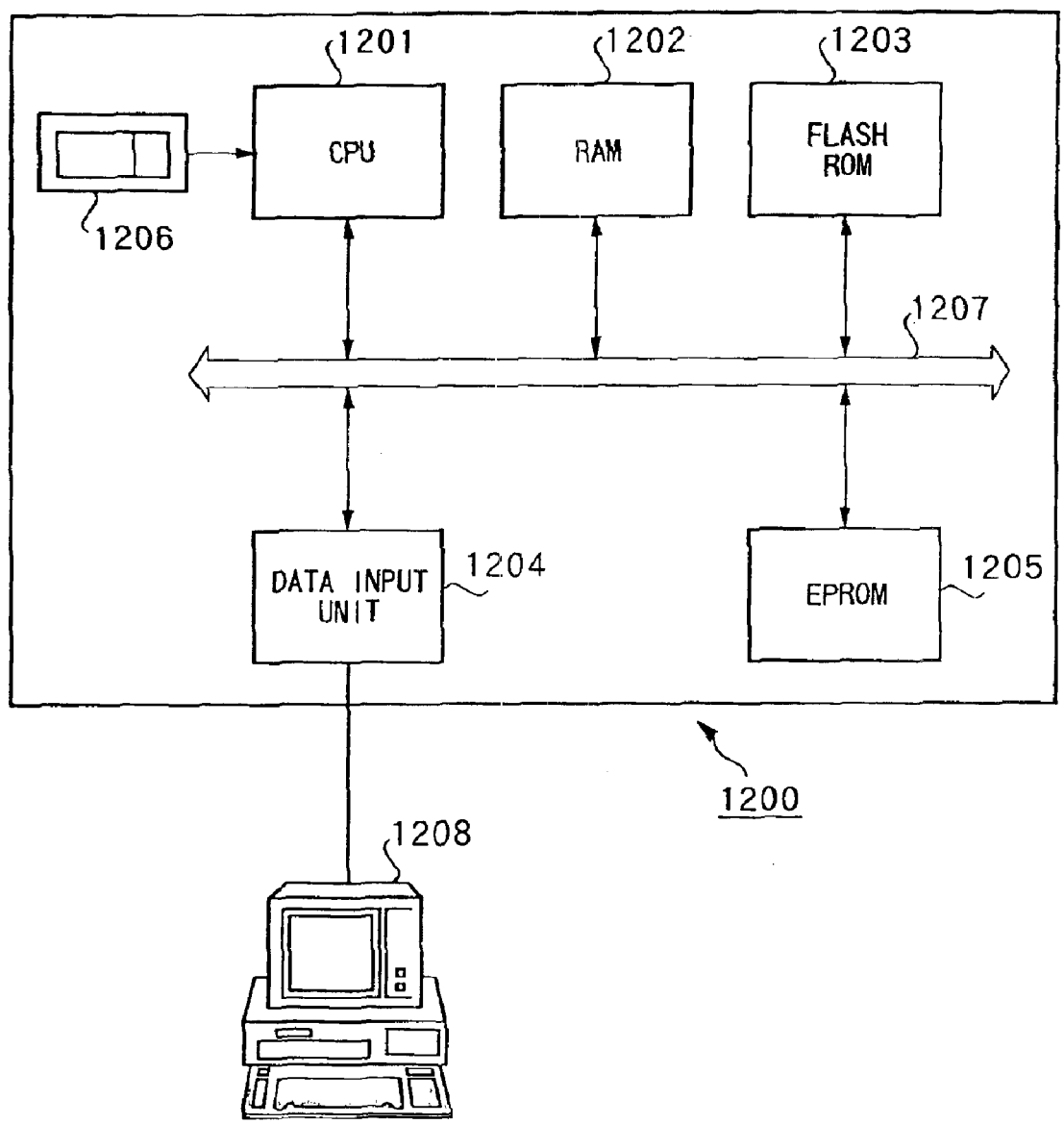
FIG. 16 is a block diagram showing a construction of an image forming apparatus according to a fourth embodiment.

FIG. 16 is a block diagram showing a construction of an image forming apparatus to which a control program writing method according to a fourth embodiment can be applied.

An image forming apparatus 1200 of this fourth embodiment is constructed of, e.g., a copying machine or a printer. The image forming apparatus 1200 primarily comprises a CPU 1201, a RAM 1202, a flash ROM 1203, a data input unit 1204, an EPROM 1205, a bus system connecting those components with one another, and a dip switch 1206.

The CPU 1201 is a central processing unit for executing arithmetic and control operations to perform control of the entire apparatus. The RAM 1202 is a memory medium for temporarily storing data, the flash ROM 1203 is a ROM for storing control programs, fixed values, etc. which are used processing executed by the CPU 201, and the EPROM 1205 is a ROM for storing a program, such as a loading program, which is not updated. The data input unit 1204 is an interface for connection between those components and a host computer 1208.

The dip switch 1206 is a switch for selecting whether the apparatus is operated in a normal manner or a control program is down-loaded. The dip switch 1206 is changed over to select a program to be started up upon power-on.

Figure 15:
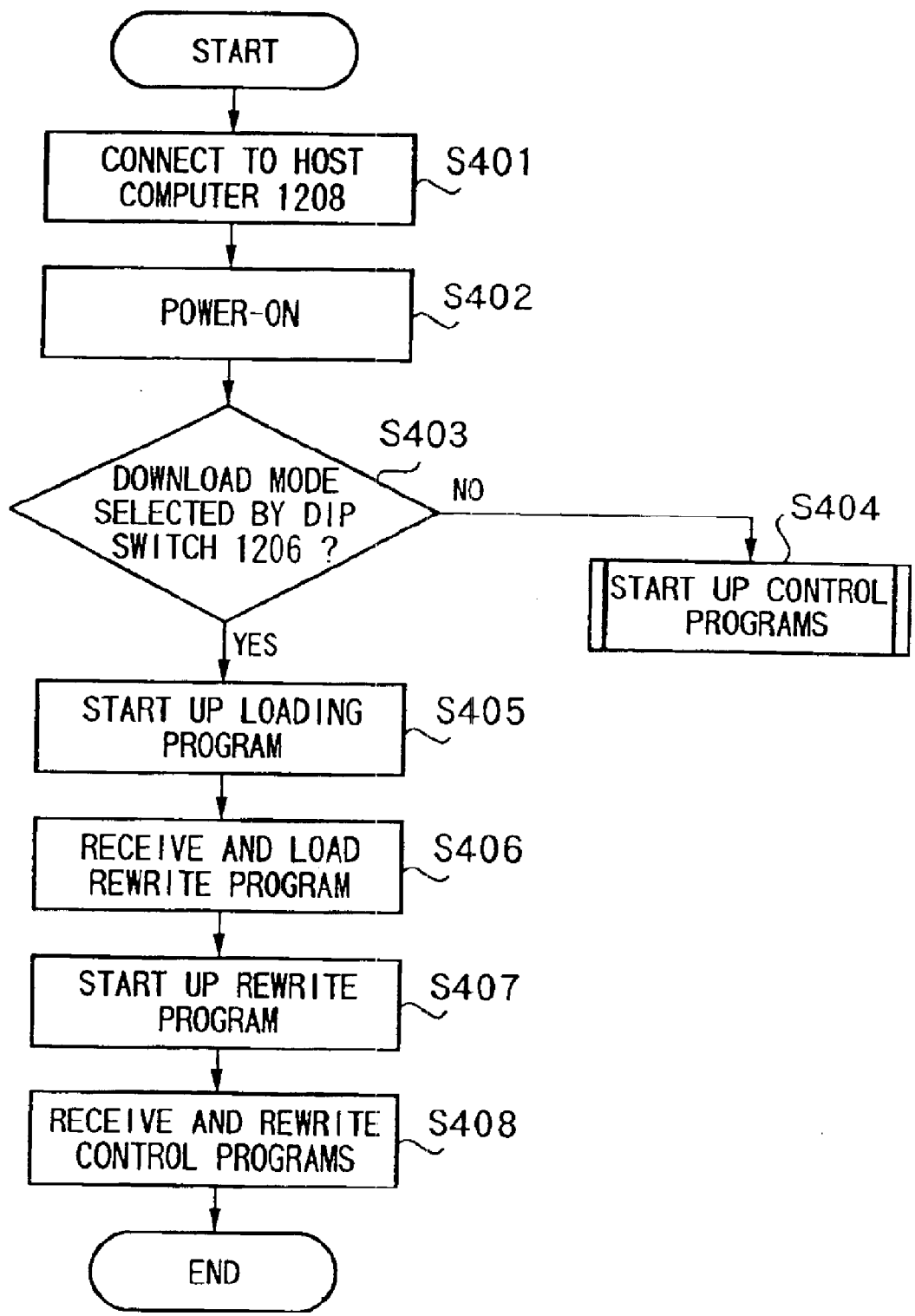
FIG. 15 is a flowchart showing a control program write process according to a fourth embodiment.

FIG. 15 is a flowchart showing a control program write process according to the fourth embodiment.

After connecting the host computer 1208 and the data input unit 1204 to each other (step S401), a power supply of the image forming apparatus 1200 is turned on (step S402).

Upon power-on of the apparatus, the CPU 1201 determines depending on the state of the dip switch 1206 whether a normal operating mode or a control program download mode is selected (step S403).

If the dip switch 1206 selects the normal operating mode, the CPU 1201 starts up the control programs stored in the flash ROM 1203 after power-on (step S404).

If the dip switch 1206 selects the control program download mode, the CPU 1201 starts up the loading program stored in the EPROM 1205 after power-on (step S405).

When the loading program is started up, the CPU 1201 is brought into a state ready for receiving a rewrite program from the host computer 1208. The host computer 1208 is then operated to transmit the rewrite program which is received by the data input unit 1204.

At this time, address information for the RAM 1202 is added to the rewrite program in the host computer 1208. The loading program reads the address information and loads the rewrite program at predetermined addresses of the RAM 1202 (step S406). In other words, the CPU 1201 loads the data, which has been received by the data input unit 1204, in the RAM 1202 in accordance with the address information added to the rewrite program. After the rewrite program has been received and loaded, the CPU 1201 starts up the rewrite program loaded in the RAM 1202, and is brought into a state ready for receiving the control programs from the host computer 1208 (step S407). The host computer 1208 is then operated to transmit the control programs which are received by the data input unit 1204.

At this time, address information for the flash ROM 1203 is added to the control programs, and the rewrite program down-loads the control programs along with the address information. Stated otherwise, in accordance with the rewrite program, the CPU 1201 first reads the added address information, specifies an area on the flash ROM 1203 to be rewritten, and then erases data in the specified area. After the erasing, the CPU 1201 loads the data, which has been received by the data input unit 1204, in the specified area of the flash ROM 1203 (step S408).

Thus, with this fourth embodiment, since the rewrite program is also down-loaded, it is only required to install a very simple program, as the loading program, in the CPU when the apparatus is manufactured. Therefore, the same download program can be used regardless of models of the apparatus.

Further, since the rewrite program is not originally installed in the apparatus and has a large flexibility, it can be prepared in match with the control programs to be downloaded. It is also easy possible to design so as to down-load part of the control programs or only data used in the control programs. In addition, even if any drawback is found in the rewrite program, the rewrite program can be replaced by the normal one without causing no effect on the apparatus.

When designing the control programs, the rewrite program can be designed in match with the control programs. Therefore, the control programs can be designed freely without suffering restrictions from the rewrite program.

Moreover, since the rewrite program is down-loaded along with the address information for the RAM 1202 added to it and the control programs are down-loaded along with the address information for the flash ROM 1203 added to it, there is obtained such an advantage that even when the program allocated addresses are changed in terms of hardware, the rewrite program and the control programs can be written without being affected by the address change.

[Fifth Embodiment]

A fifth embodiment of the present invention will be described below with reference to FIG. 17.

In the above fourth embodiment, the control program download mode and the normal operating mode are changed over depending on the state of the dip switch 1206. On the other hand, this fifth embodiment is constructed to change over the control program download mode and the normal operating mode in response to a command from the host computer 1208.

The other construction and operation of the fifth embodiment are similar to those of the fourth embodiment; hence a description thereof is omitted here. Namely, a control program writing method according to this fifth embodiment can be applied to not only the apparatus shown in FIG. 16 with no need of modifying the apparatus, but also an apparatus in which the dip switch 1206 among the components the apparatus shown in FIG. 16 is eliminated.

Figure 17:
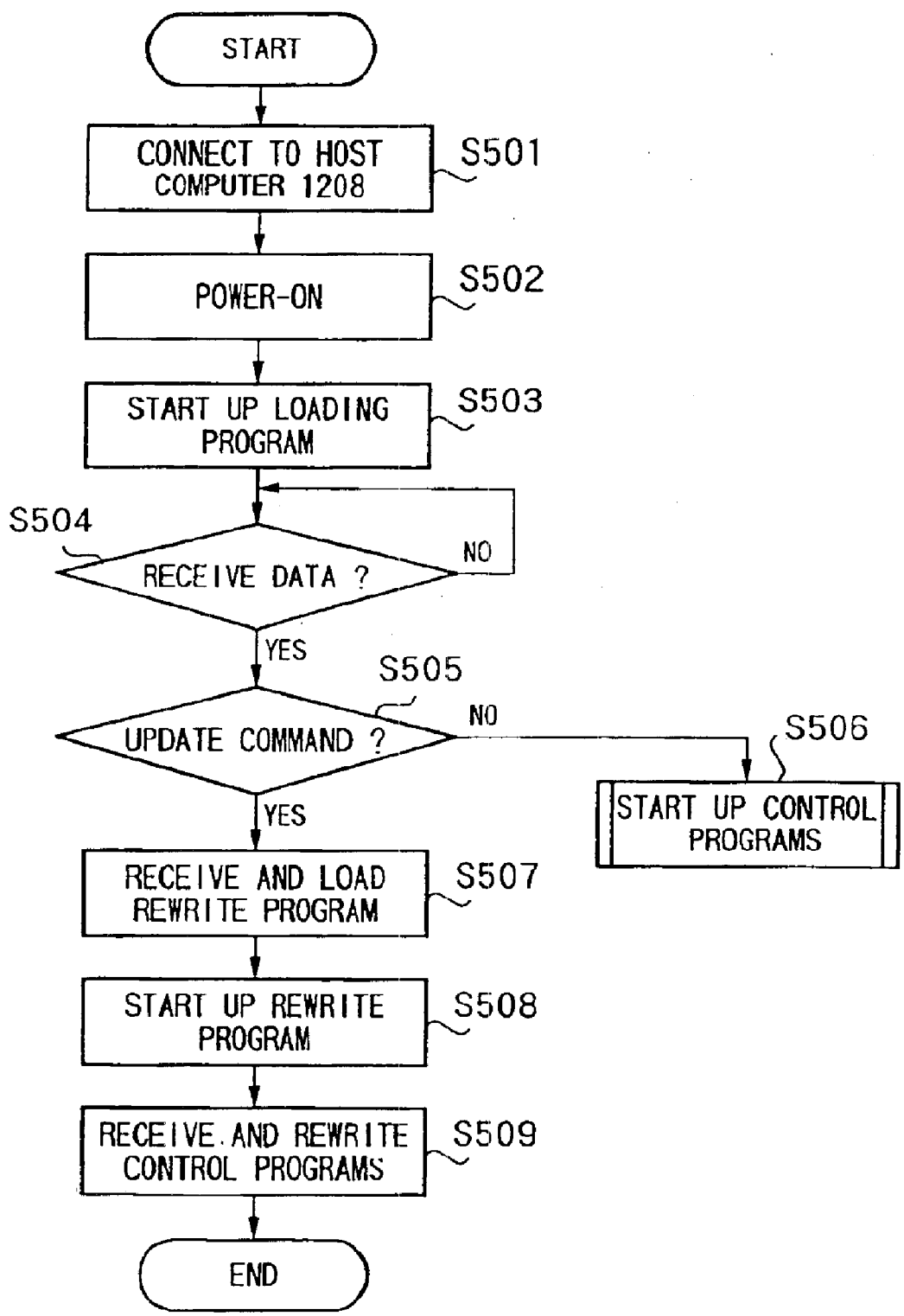
FIG. 17 is a flowchart showing a control program write process according to a fifth embodiment.

FIG. 17 is a flowchart showing a control program write process according to the fifth embodiment.

After connecting the host computer 1208 and the data input unit 1204 to each other (step S501), the power supply of the image forming apparatus 1200 is turned on (step S502). Upon power-on of the apparatus, the CPU 1201 starts up the loading program stored in the EPROM 1205 after confirming the connection with the host computer 1208, and it is brought into a state ready for receiving data from the host computer 1208 (step S503). When the first data is received (step S504), the CPU 1201 confirms whether the received data is an update command (step S505). If the received data is the update command, the CPU 1201 executes the processing subsequent to step S507. If the received data is not the update command, the CPU 1201 starts up the control programs in step S506.

If the received data is the update command, the CPU 1201 is brought into a state ready for receiving the write program from the host computer 1208. The host computer 1208 is then operated to transmit the rewrite program which is received by the data input unit 1204.

At this time, address information for the RAM 1202 is added to the rewrite program.

Subsequently, the CPU 1201 loads the data, which has been received by the data input unit 1204, in the RAM 1202 in accordance with the address information added to the rewrite program (step S507). After the rewrite program has been received and loaded, the CPU 1201 starts up the rewrite program loaded in the RAM 1202, and is brought into a state ready for receiving the control programs from the host computer 1208 (step S508). The host computer 1208 is then operated to transmit the control programs which are received by the data input unit 1204.

At this time, address information for the flash ROM 1203 is added to the control programs.

Then, in accordance with the address information added to the rewrite program, the CPU 1201 specifies an area on the flash ROM 1203 to be rewritten, and then erases data in the specified area. After the erasing, the CPU 1201 loads the data, which has been received by the data input unit 1204, in the specified area of the flash ROM 1203 in accordance with the added address information (step S509).

With the process described above, in addition to the advantages obtainable with the above fourth embodiment, an advantage of needing no dip switch and achieving a simpler hardware construction of the apparatus can be provided by this fifth embodiment.

Thus, according to the fourth and fifth embodiments, it is possible to efficiently down-load the control programs and design the control programs with a large flexibility. Further, even when the program allocated addresses are changed in terms of hardware, the download control program (rewrite program) which is installed in the apparatus and download applications which are operated on the host computer can be used as they are without being affected by the address change.

[Other Embodiments]

The present invention may be applied to not only a system comprising a plurality of equipment (e.g., a host computer, an interface unit, a reader and a printer), but also an apparatus comprising a single piece of equipment (e.g., a copying machine and a facsimile).

While the above embodiments have been described as supplying the rewrite program and the control programs from the host computer, it is possible to achieve the object of the present invention in other forms. Thus, the present invention can also be of course implemented by supplying a memory medium, which stores therein program codes of software for realizing the function of any of the above-described embodiments, to a system or apparatus, and by causing a computer (CPU or MPU) in the system or apparatus to read and execute the program codes, such as the rewrite program and the control programs, stored in the memory medium.

In such a case, the program codes read out of the memory medium serve in themselves to realize the function of any of the above-described embodiments, and therefore the memory medium storing the program codes constitutes the present invention.

Memory media for storing the program codes may be, e.g., floppy disks, hard disks, optical disks, magneto-optical disks, CD-ROMs, CD-Rs, magnetic tapes, nonvolatile memory cards, and ROMs.

Also, the function of any of the above-described embodiments is realized by not only a computer executing the program codes read by it, but also the case where an OS (Operating System) or the like, which is working on the computer, executes a part or the whole of actual processing in accordance with instructions of the program codes. It is thus a matter of course that the above latter case is also involved in modified embodiments of the present invention.

Further, it is needless to say that the present invention involves such a case where the program codes read out of the memory medium are stored in a memory built in a function add-in board of a computer or a function add-in unit connected to the computer, and a CPU or the like incorporated in the function add-in board or unit then executes a part or the whole of the actual processing in accordance with instructions from the program codes, thereby realizing the function of any of the above-described embodiments.

Where the present invention is applied to the above-mentioned memory medium, programs codes corresponding to the flowchart described above in connection with any of the embodiments are stored in the memory medium.

The present invention has been described above in connection with several preferred embodiments, the present invention is not limited to the illustrated embodiments and may be modified in various ways within the scope defined in the appended Claims.

What is claimed is:

1. An image forming apparatus for forming an image in accordance with control codes, said image forming apparatus comprising:

a printing unit for printing an image;

a memory for storing the control codes to control said image forming apparatus having said printing unit;

display means for displaying messages associated with an image forming operation;

receiving means for receiving, from an external apparatus, rewrite execution codes, which are adapted to execute rewriting of the control codes in said memory, in accordance with transfer control codes which are adapted to control transfer of the rewrite execution codes from the external apparatus, and receiving, from the external apparatus, new control codes;

rewriting means for rewriting the control codes, which have been stored in said memory, with the new control codes received by said receiving means, in accordance with the rewrite execution codes received by said receiving means; and determination means for, after a power supply is turned on, determining whether rewriting of the control codes has suspended or failed, wherein if the rewriting of the control codes has suspended or failed, the rewrite execution codes are received from the external apparatus in accordance with the transfer control codes, the new control codes are received from the external apparatus and the control codes are rewritten with the new control codes in accordance with the rewrite execution codes.

2. The image forming apparatus according to claim 1, wherein the rewrite execution codes are transferred to a nonvolatile memory medium as said memory and stored therein.

3. The image forming apparatus according to claim 1, wherein the rewrite execution codes include address information of said memory for executing rewriting of the control codes, and said rewriting means executes the rewriting of the control codes, which have been stored in said memory, in accordance with the address information.

4. The image forming apparatus according to claim 1, further comprising:

image forming control means for controlling an image forming process in accordance with the control codes; and switching means for exclusively changing over whether the image forming process is executed by said image forming control means or whether rewriting of the control codes is executed by said rewriting means.

5. The image forming apparatus according to claim 4, wherein said switching means exclusively changes over using a predetermined switch whether the image forming process is executed by said image forming control means or whether the rewriting of the control codes is executed by said rewriting means.

6. The image forming apparatus according to claim 4, wherein said switching means exclusively changes over in accordance with a predetermined command from said external apparatus whether the image forming process is executed by said image forming control means or whether the rewriting of the control codes is executed by said rewriting means.

7. An image forming apparatus for forming an image in accordance with control codes, said image forming apparatus comprising:

a printing unit for printing an image;

a code memory for storing control codes which are adapted to control the image forming apparatus having said printing unit; and a processor for controlling the image forming apparatus in accordance with the control codes stored in said code memory, wherein, after a power supply is turned on, said processor determines whether rewriting of the control codes has suspended or failed, and if the rewriting of the control codes has suspended or failed, said processor controls transfer of the rewrite execution codes, which are adapted to execute rewriting of the control codes from an external apparatus, said processor controls transfer of new control codes from the external apparatus, and said processor controls the rewriting of the control codes, which have been stored in said code memory, with the new control codes transferred from the external apparatus, in accordance with the rewrite execution codes transferred from the external apparatus.

8. The image forming apparatus according to claim 7, wherein said processor controls transfer of the rewrite execution codes in accordance with transfer control codes which are adapted to control transfer of the rewrite execution codes from the external apparatus.

9. The image forming apparatus according to claim 7, wherein said code memory is a rewritable memory.

10. The image forming apparatus according to claim 7, wherein the image forming apparatus is a copying machine or a printer.

11. The image forming apparatus according to claim 7, wherein the rewrite execution codes include address information of said code memory and said processor controls rewriting of the control codes with the new control codes transferred from the external apparatus in accordance with the address information.

12. The image forming apparatus according to claim 7, wherein said processor exclusively changes over control of an image forming process and rewriting the control codes.

13. A rewrite control method for rewriting control codes, which have been stored in a memory and are adapted to control an image forming apparatus having a printing unit to form an image, said rewrite control method comprising:

a displaying step of displaying messages associated with an image forming operation;

a receiving step of receiving, from an external apparatus, rewrite execution codes, which are adapted to execute rewriting of the control codes in the memory, in accordance with transfer control codes which are adapted to control transfer of the rewrite execution codes from the external apparatus, and receiving, from the external apparatus, new control codes;

a rewriting step of rewriting the control codes, which have been stored in the memory, with the new control codes received by said receiving step, in accordance with the rewrite execution codes received by said receiving step; and a determination step of, after a power supply is turned on, determining whether rewriting of the control codes has suspended or failed, wherein if the rewriting of the control codes has suspended or failed, the rewrite execution codes are received from the external apparatus in accordance with the transfer control codes, the new control codes are received from the external apparatus, and the control codes are rewritten with the new control codes in accordance with the rewrite execution codes.

14. A rewrite control method for rewriting control codes, which have been stored in a code memory and are adapted to control an image forming apparatus having a printing unit to form an image, said rewrite control method comprising:

a first control step of controlling transfer of rewrite execution codes, which are adapted to execute rewriting of control codes from an external apparatus;

a second control step of controlling transfer of new control codes from the external apparatus;

a third control step of, after a power supply is turned on, said processor determines whether rewriting of the control codes has suspended or failed, and if the rewriting of the control codes has suspended or failed controlling the rewriting of the control codes, which have been stored in the code memory, with the new control codes transferred from the external apparatus, in accordance with the rewrite execution codes transferred from the external apparatus.

* * * * *

UNITED STATES PATENT AND TRADEMARK OFFICE
CERTIFICATE OF CORRECTION

PATENT NO.    : 6,854,000 B2
DATED         : February 8, 2005
INVENTOR(S)   : Hideyuki Ikegami et al.

It is certified that error appears in the above-identified patent and that said Letters Patent is hereby corrected as shown below:

Column 1,
Line 38, "slightly" should be deleted.
Line 38, "unstable." should read -- slightly unstable --.

Column 3,
Line 45, "reelected" should read -- reflected --.

Column 4,
Line 32, "start" should read -- starts --.
Line 58, "key/-display" should read -- key/display --.

Column 5,
Line 2, "input/-output" should read -- input/output --.
Line 64, "transfer/-download" should read -- transfer/download --.

Column 7,
Lines 21 and 62, "is received" should read -- which is received --.
Lines 23 and 64, "divided in" should read -- divided into --.

Column 8,
Line 34, "is received" should read -- which is received --.
Line 36, "divided in" should read -- divided into --.

Column 9,
Line 26, "plurally" should read -- plurality --.
Line 36, "key/-display" should read -- key/display --.
Line 47, "input/-output" should read -- input/output --.

Column 10,
Line 42, "transfer/-download" should read -- transfer/download --.

Column 11,
Line 38, "waists" should read -- waits --.
Line 39, "If" should read -- if --.

Column 12,
Lines 8 and 49, "is received" should read -- which is received --.
Lines 10 and 51, "divided in" should read -- divided into --.

Column 13,
Line 21, "is received" should read -- which is received --.
Line 23, "divided in" should read -- divided into --.

UNITED STATES PATENT AND TRADEMARK OFFICE
CERTIFICATE OF CORRECTION

PATENT NO. : 6,854,000 B2
DATED : February 8, 2005
INVENTOR(S) : Hideyuki Ikegami et al.

It is certified that error appears in the above-identified patent and that said Letters Patent is hereby corrected as shown below:

Column 14,
Line 19, "slightly" should be deleted.
Line 19, "unstable," should read -- slightly unstable, --.

Column 15,
Line 25, "input/-output" should read -- input/output --.

Column 17,
Lines 5 and 48, "is received" should read -- which is received --.
Lines 7 and 48, "divided in" should read -- divided into --.

Column 18,
Line 18, "is received" should read -- which is received --.
Line 20, "divided in" should read -- divided into --.

Column 19,
Line 27, "processing" should read -- in processing --.

Column 20,
Line 22, "easy" should be deleted, and "design" should read -- easily design --.
Line 26, "no effect" should read -- any effect --.

Column 22,
Line 26, "embodiments, the" should read -- embodiments, however the --.

Signed and Sealed this

Twenty-second Day of November, 2005

JON W. DUDAS
*Director of the United States Patent and Trademark Office*